United States Patent
Zhan et al.

(10) Patent No.: US 11,769,210 B1
(45) Date of Patent: *Sep. 26, 2023

(54) COMPUTER-BASED MANAGEMENT METHODS AND SYSTEMS

(71) Applicant: Massachusetts Mutual Life Insurance Company, Springfield, MA (US)

(72) Inventors: Haimao Zhan, Springfield, MA (US); David Lovejoy, West Hartford, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,460

(22) Filed: Jan. 31, 2022

Related U.S. Application Data

(63) Continuation of application No. 16/502,923, filed on Jul. 3, 2019, now Pat. No. 11,270,384, which is a
(Continued)

(51) Int. Cl.
*G06Q 40/08* (2012.01)
*G06N 20/00* (2019.01)
(Continued)

(52) U.S. Cl.
CPC ......... *G06Q 40/08* (2013.01); *G06F 16/2477* (2019.01); *G06F 16/24578* (2019.01); *G06F 18/2148* (2023.01); *G06N 20/00* (2019.01)

(58) Field of Classification Search
CPC .... G06Q 40/08; G06N 20/00; G06F 16/2477; G06F 16/24578; G06F 18/2148
(Continued)

(56) References Cited

U.S. PATENT DOCUMENTS 7,260,548 B1 8/2007 Allsup
2005/0125259 A1 6/2005 Annappindi
(Continued)

OTHER PUBLICATIONS

Allison, "Discrete-time methods for the analysis of event histories," Sociological Methodology, vol. 13, <https://statisticalhorizons.com/wp-content/uploads/Allison.SM82.pdf>, 1982, (39 pages).
(Continued)

*Primary Examiner* — Hosain T Alam
*Assistant Examiner* — Nicholas E Allen
(74) *Attorney, Agent, or Firm* — Foley & Lardner LLP

(57) ABSTRACT

A DI recovery management system generates a plurality of ranked claimant records and recovery scores. A predictive machine learning model inputs disability income claim data and disability income claimant data into an event history model utilizing discrete-time survival analysis in conjunction with a gradient boosting machine learning model. The claim termination event is one of a plurality of preselected recovery events that indicate that a claimant has achieved return-to-work capacity. Claimant data used in modeling includes diagnosis data representative of workplace disability duration guidelines. The predictive machine learning model is continually trained using updated disability income claims data. The training procedure transforms claimant records extracted from a DI claims database into a longitudinal format that includes multiple person-year records corresponding to each claimant record. A DI recovery dashboard displays a hazard plot representing a conditional probability over time that a claimant will realize a claim termination event.

20 Claims, 14 Drawing Sheets

Related U.S. Application Data continuation-in-part of application No. 15/280,770, filed on Sep. 29, 2016, now Pat. No. 10,395,217.

(60) Provisional application No. 62/234,924, filed on Sep. 30, 2015.

(51) Int. Cl.
    *G06F 16/2457* (2019.01)
    *G06F 16/2458* (2019.01)
    *G06F 18/214* (2023.01)

(58) Field of Classification Search
    USPC .................................................. 705/4
    See application file for complete search history.

(56) References Cited

U.S. PATENT DOCUMENTS

| | | | |
|---|---|---|---|
| 2007/0038036 A1* | 2/2007 | Sellers, II | A61B 5/16 600/300 |
| 2008/0177836 A1 | 7/2008 | Bennett | |
| 2009/0112632 A1 | 4/2009 | Belliveau et al. | |
| 2009/0299767 A1* | 12/2009 | Michon | G16H 10/60 707/999.005 |
| 2011/0258308 A1 | 10/2011 | Arumugam et al. | |
| 2012/0072240 A1 | 3/2012 | Grosso et al. | |
| 2013/0024124 A1 | 1/2013 | Collazo et al. | |
| 2013/0054259 A1 | 2/2013 | Wojtusiak et al. | |
| 2013/0073344 A1 | 3/2013 | Parent | |
| 2013/0110775 A1 | 5/2013 | Forsythe | |
| 2013/0132122 A1 | 5/2013 | Walsh et al. | |
| 2013/0144645 A1 | 6/2013 | Bjorner et al. | |
| 2013/0291060 A1 | 10/2013 | Moore | |
| 2014/0067732 A1 | 3/2014 | Doganata et al. | |
| 2014/0095201 A1 | 4/2014 | Farooq et al. | |
| 2014/0122989 A1 | 5/2014 | Eigner et al. | |
| 2014/0200913 A1 | 7/2014 | Budhrani et al. | |
| 2014/0324457 A1 | 10/2014 | Kim et al. | |
| 2014/0336479 A1 | 11/2014 | Ando | |
| 2014/0344718 A1 | 11/2014 | Rapaport et al. | |
| 2014/0358591 A1* | 12/2014 | Gray | G06Q 40/08 705/4 |
| 2014/0377727 A1 | 12/2014 | Yom-Tov et al. | |
| 2015/0024358 A1 | 1/2015 | Kamiya et al. | |
| 2015/0046181 A1 | 2/2015 | Adjaoute | |
| 2015/0106129 A1 | 4/2015 | Kinney et al. | |
| 2015/0213556 A1* | 7/2015 | Haller, Jr. | G06Q 40/08 705/4 |
| 2015/0254555 A1* | 9/2015 | Williams, Jr. | G06N 3/045 706/14 |
| 2016/0198996 A1 | 7/2016 | Dullen | |
| 2016/0232806 A1 | 8/2016 | Isaka | |
| 2016/0246936 A1 | 8/2016 | Kahn | |

OTHER PUBLICATIONS

Allison, "Event history and survival analysis: Regression for longitudinal event data" SAGE Publications, vol. 16, 2014, (87 pages).

Brown, "On the Use of Indicator Variables for Studying the Time-Dependence of Parameters in a Response-Time Model", Biometrics, vol. 31, No. 4, Dec. 1975, (10 pages).

Gaspar, "Duration Views Methodology," MD Guidelines, The measure of health, 2007, pp. 1-13.

Lovejoy, et al., Office Action dated Aug. 31, 2018 directed to U.S. Appl. No. 15/280,770 (35 pages).

Non-Final Office Action on U.S. Appl. No. 16/502,923 dated Jun. 16, 2021.

Reed, sample topic, "Muscle Injury, The Medical Disability Advisor: Workplace Guidelines for Disability Duration," ReedGroup, copyright 2005, (5 pages).

Singer et al., "It's about time: using discrete-time survival analysis to study duration and the timing of events", Journal of Educational Statistics, vol. 18, No. 2, Summer, 1993 (42 pages).

U.S. Non-Final Office Action on U.S. Appl. No. 15/280,770 dated Aug. 31, 2018 (35 pages).

U.S. Notice of Allowance on U.S. Appl. No. 16/502,923 dated Oct. 29, 2021.

U.S. Notice of Allowance on U.S. Appl. No. 15/280,770 dated Apr. 30, 2019 (7 pages).

* cited by examiner

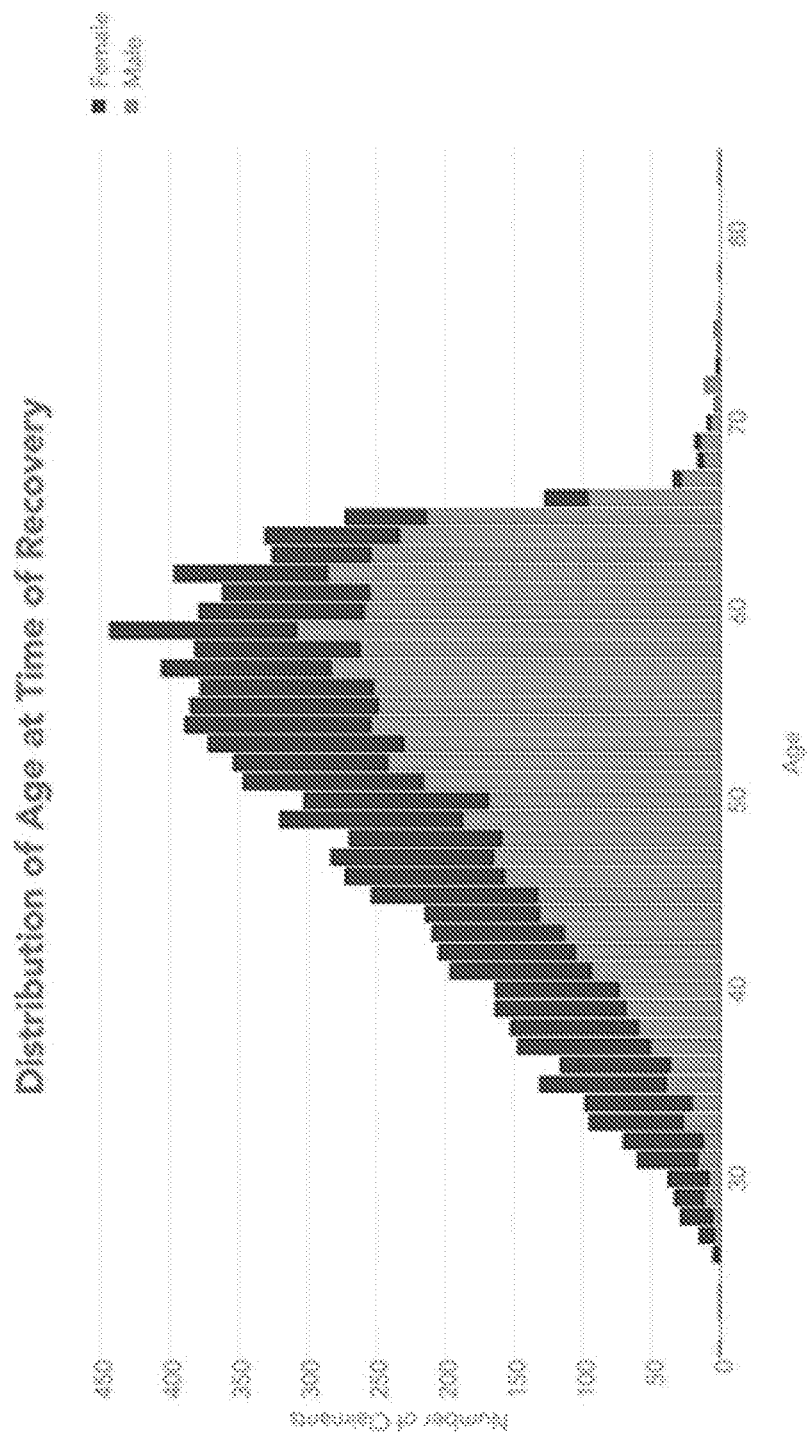

FIG. 12
Gradient Boosting
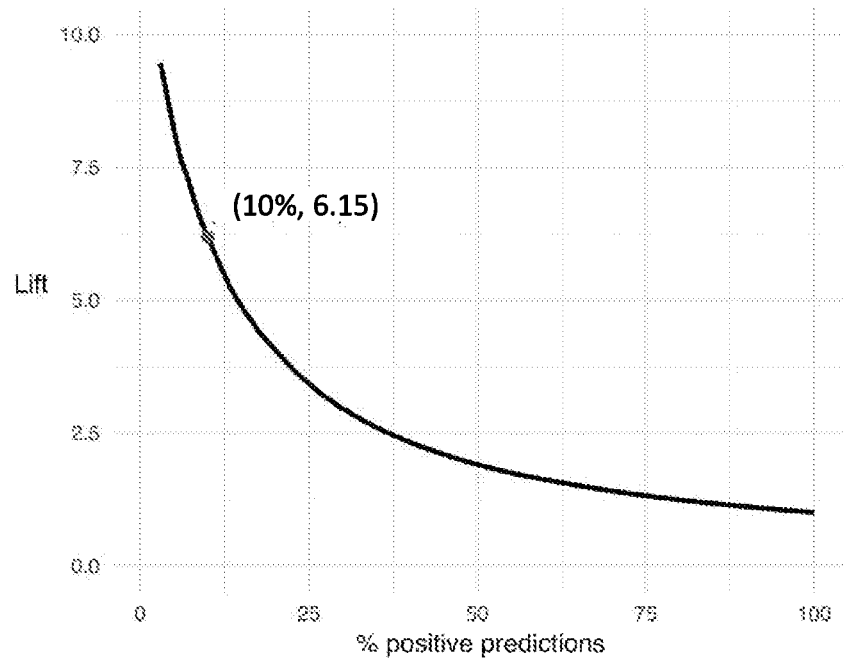
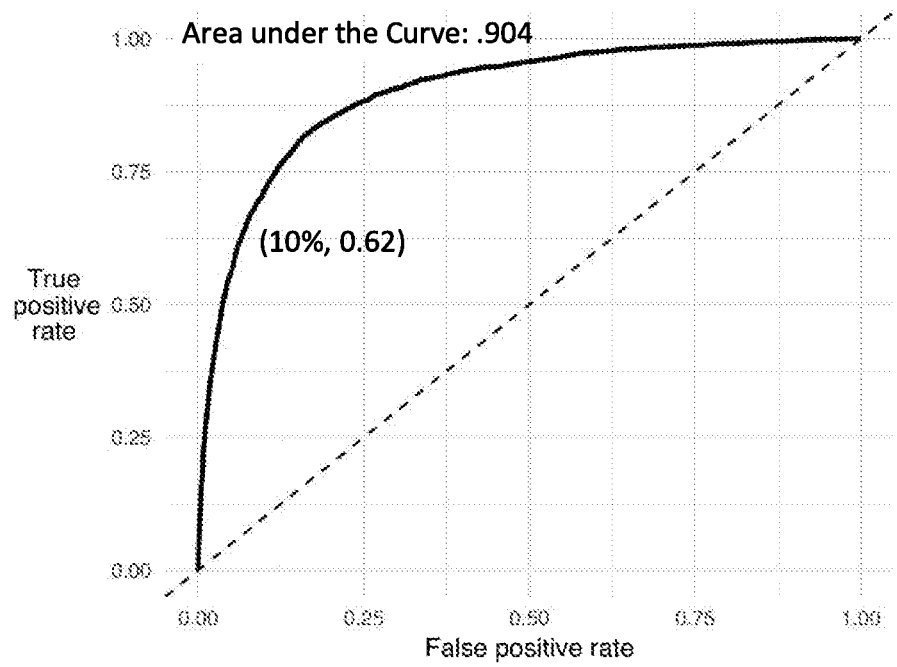

FIG. 13
Elastic Net Regression
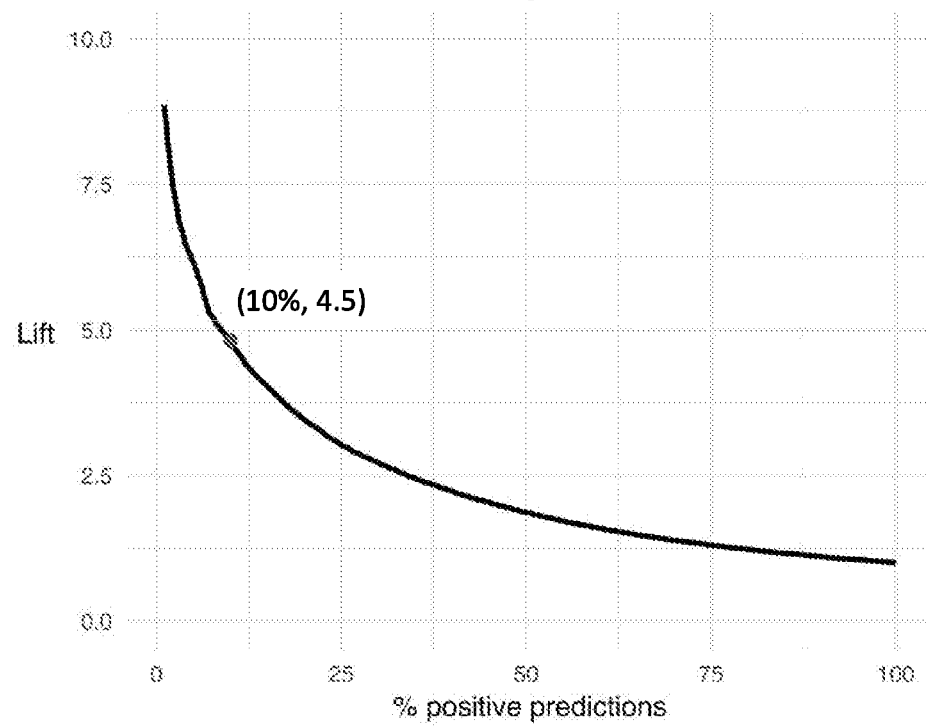
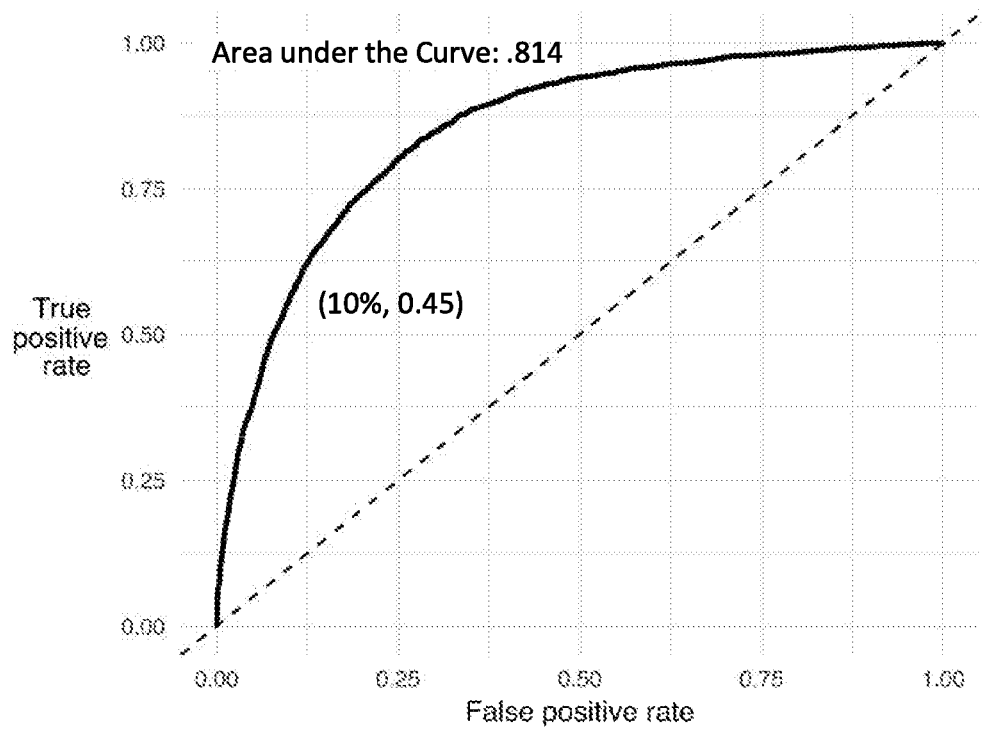

FIG. 14
Random Forests
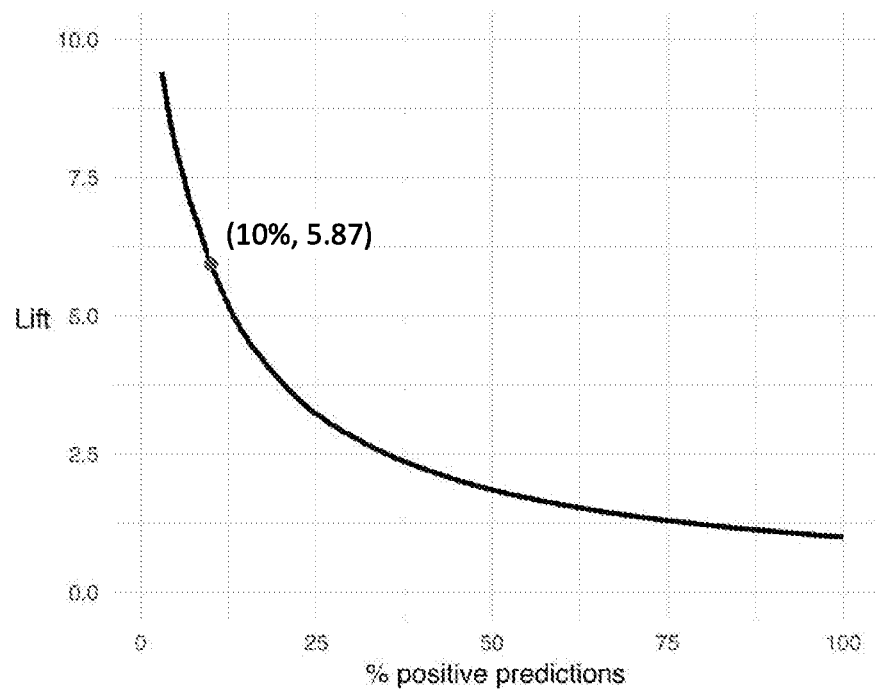
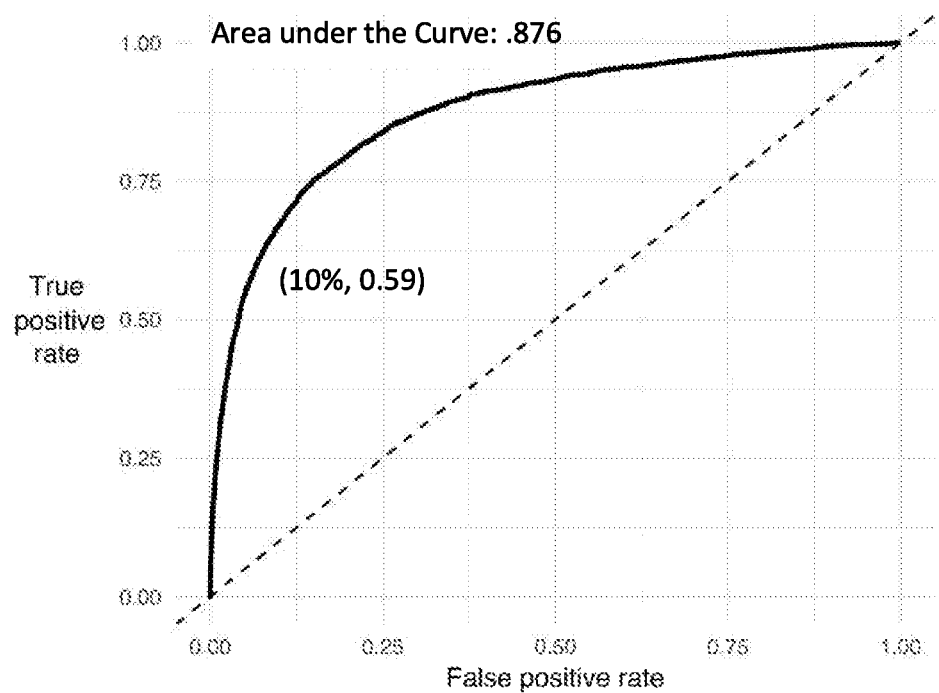

COMPUTER-BASED MANAGEMENT METHODS AND SYSTEMS

CROSS-REFERENCE TO RELATED APPLICATIONS

The present application is a continuation of U.S. patent application Ser. No. 16/502,923, entitled "COMPUTER-BASED MANAGEMENT METHODS AND SYSTEMS," filed Jul. 3, 2019, which is a continuation-in-part of U.S. patent application Ser. No. 15/280,770 (now U.S. Pat. No. 10,395,217), entitled "COMPUTER-BASED MANAGEMENT METHODS AND SYSTEMS," filed Sep. 29, 2016, which claims benefit of U.S. Provisional Application No. 62/234,924 filed Sep. 30, 2015, entitled "COMPUTER-BASED PERSONNEL MANAGEMENT METHODS AND SYSTEMS," all of which are hereby incorporated by reference in their entirety.

TECHNICAL FIELD

The present disclosure relates in general to computer-based disability income management methods and systems, and particularly for computer-based methods and systems related to disability insurance claims and to recovery from such claims.

BACKGROUND

Existing computer-based systems for managing disability insurance claims cannot adequately predict a return time frame for an employee on disability leave. This is partially due to the fact that the expected return date is based upon a wide variety of factors. For example, the expected return date can be based upon a medical diagnosis or based on the employee's general conditions. In many instances, the health assessment of an employee in view of the employee's overall conditions has proven to change over time. In many other cases, the return expectation date may change during the time that the employee is on disability leave. For example, as the time that an employee is on disability leave increases, it is generally observed that the likelihood of the employee returning to work decreases exponentially, even though the expected return date remains the same and cannot account for this likelihood. Additionally, when an employee claims disability, that employee may initially assess an return expectation date. However, later during the disability leave period, the employee may adjust to the receipt of the disability payment, and lose the inclination to return to work. It is generally observed that as the disability leave time increases, employee becomes more accustomed and comfortable and are less likely to return to work thereby requiring a larger than expected disability payment. As a result, the conventional computer-based personnel management systems cannot properly calculate or determine a status of current and future employees, thereby affecting administration of disability income claims.

Disability insurance claims examiners typically handle a large caseload and do not have the time or resources to regularly follow up with all disabled claimants. Often, a claims examiner's interactions with disabled claimants entail laborious manual procedures. Thus, claims examiners can have difficulty tracking if, and when, claimants within their caseload are expected to return to work. What is needed are systems and methods that enable a user (e.g., a claims examiner) to identify disability claimants that are most likely to reach full, return-to-work capacity soon, so that the user can prioritize interactions with these claimants about their plans and recovery status. Also needed are systems and methods that enable a user to identify disability claimants that have forgotten or neglected to inform the user about the claimant's return to work.

SUMMARY

The methods and systems described herein attempt to address the deficiencies of the conventional systems to more efficiently analyze disability claims that are most likely to reach full, return-to-work capacity using a predictive machine learning model, and to display a specialized graphical user interface configured to present the claim recovery analyses.

A predictive machine learning model is configured to determine a plurality of ranked claimant records and recovery scores representative of a likelihood that claimants will realize a claim termination event. The predictive machine learning model inputs disability income claim data representative of disability income insurance claims and disability income claimant data representative of claimants for disability income insurance into an event history model. The event history model utilizes discrete-time survival analysis in conjunction with a machine learning model for feature selection. In an embodiment, in modeling DI recovery the positive class in the target variable is one of a plurality of preselected claim termination events representative of a claimant achieving return to work capacity.

In an embodiment, the claimant data includes diagnosis data representative of workplace disability duration guidelines. In an embodiment, the diagnosis data are representative of Presley Reed workplace disability duration guidelines.

In an embodiment, the event history model is a predictive machine learning model continually trained using updated disability income claims data associated with the claimants for disability income insurance. In the present disclosure, disability income claims are sometimes called "DI" claims, and are sometimes called DI insurance claims. In an embodiment, the updated DI claims data is extracted from a disability income insurance claims database. In an embodiment, the continual training procedure extracts DI claims data associated with the claimants for disability income insurance from a disability income insurance claims database, and transforms the extracted data into a longitudinal format. The longitudinal format of the transformed data includes multiple person-time period records corresponding to each claimant record, wherein each person-time period records corresponding to a respective time period of observation for the respective claimant record.

In an embodiment, the machine learning model for feature selection is a gradient boosting machine learning model. In an embodiment, the gradient boosting machine learning model is an XGBoost model. In another embodiment, the machine learning model for feature selection is a logistic regression model with elastic net regularization. In a further embodiment, the machine learning model for feature selection is a random decision forest model.

In an embodiment, the claim termination event is one of a plurality of preselected recovery events representative of whether or not the claimant achieves return-to-work capacity in a given year. In an embodiment, continual training of the predictive machine learning model transforms model input data into a longitudinal format that includes multiple person year records corresponding to each claimant record, wherein each person year record corresponds to an identified year of observation for the respective claimant record.

In an embodiment, the system is configured to update and display in real time the information representative of the plurality of ranked claimant records and the recovery scores representative of the likelihood that respective claimant records will realize the claim termination event. In an embodiment, the system is configured to display, for each of the plurality of ranked claimant records, a hazard plot representative of a conditional probability over time that the respective will realize the claim termination event. In an embodiment, the system is configured to display, for each of the plurality of ranked claimant records, a bar chart in which the bars represent the probability of realizing the claim termination event during respective years of the claimant's life.

In one embodiment, a processor-based method comprises executing, by a processor, a predictive machine learning model configured to determine a recovery score for each claimant record of a plurality of claimant records stored in a disability income database, by inputting disability income claim data representative of disability income insurance claims and disability income claimant data representative of claimants for disability income insurance into an event history model utilizing discrete time survival analysis in conjunction with a machine learning model for feature selection, the event history model outputting a plurality of ranked claimant records and recovery scores representative of a likelihood that respective claimant records will realize a claim termination event, wherein the claim termination event is one of a plurality of preselected recovery events representative of representative of a claimant achieving return-to-work capacity; wherein the event history model is a predictive machine learning model that is continually trained using updated disability income claimant data representative of the claimants for disability income insurance and transforming the updated data into a longitudinal format that includes multiple person-time period records corresponding to each claimant record, each person-time period records corresponding to a respective time period of observation for the respective claimant record; wherein the disability income claimant data includes diagnosis data representative of workplace disability duration guidelines; and running, by the processor, the event history model on demand to update and display, by a display device in operative communication with the processor, a graphical user interface showing a report of the plurality of ranked claimant records, and the recovery scores representative of a likelihood that respective claimants will realize a claim termination event.

In another embodiment, a processor-based method comprises executing, by a processor, a predictive machine learning model configured to determine a recovery score for each claimant record of a plurality of claimant records representative of claimants for disability income insurance stored in a disability income database, by inputting disability income claim data representative of disability income insurance claims and disability income claimant data for the claimants for disability income insurance into a predictive machine learning model utilizing discrete time survival analysis in conjunction with gradient boosting, the predictive machine learning model outputting a plurality of ranked claimant records and recovery scores representative of a likelihood that respective claimant records will realize a claim termination event; wherein the claim termination event is one of a plurality of preselected recovery events representative of a claimant achieving return-to-work capacity; wherein the predictive machine learning model is continually trained via updated disability income claimant data and updated data representative of the claimants for disability income insurance; wherein the claimant data includes diagnosis data representative of workplace disability duration guidelines; and running, by the processor, the event history model on demand to update and display, by a display device in operative communication with the processor, a graphical user interface showing a report of the plurality of ranked claimant records and the recovery scores representative of a likelihood that respective claimants will realize a claim termination event.

In a further embodiment, a system comprises non-transitory machine-readable memory that stores claimant records for a plurality of claimants for disability income insurance, disability income claims data representative of disability income insurance claims, and diagnosis data representative of workplace disability duration guidelines; a predictive modeling module that stores a predictive machine learning model configured to determine a plurality of ranked claimant records and recovery scores representative of a likelihood that respective claimant records will realize a claim termination event comprising one of a plurality of preselected recovery events representative of a claimant achieving return-to-work capacity, the predictive machine learning model utilizing discrete-time survival analysis in conjunction with gradient boosting; wherein the predictive machine learning model is continually trained via updated claimant records, updated disability income claims data, and updated diagnosis data; and a processor in operative communication with the display, wherein the processor in communication with the non-transitory, machine-readable memory and the predictive modeling module executes a set of instructions instructing the processor to: apply the discrete-time survival analysis in conjunction with gradient boosting to the plurality of claimant records for a plurality of claimants for disability income insurance, disability income claims data representative of disability income insurance claims, and diagnosis data representative of workplace disability duration guidelines, to determine the plurality of ranked claimant records and the recovery scores representative of the likelihood that respective claimant records will realize a claim termination event; and run the predictive machine learning module on demand to update and display, by a display device in operative communication with the processor, a graphical user interface showing a report of the plurality of ranked claimant records and the recovery scores representative of the likelihood that respective claimant records will realize a claim termination event.

Numerous other aspects, features, and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 5 displays distribution of age at time of recovery, according to an embodiment.

FIG. 12 is a graph of a lift curve and a receiver operator curve (ROC) for a gradient boosting model for predicting DI recovery.

FIG. 13 is a graph of a lift curve and a receiver operator curve (ROC) for an elastic net regression model for predicting DI recovery.

FIG. 14 is a graph of a lift curve and a receiver operator curve (ROC) for a random forests model for predicting DI recovery.

DETAILED DESCRIPTION

Figure 1:
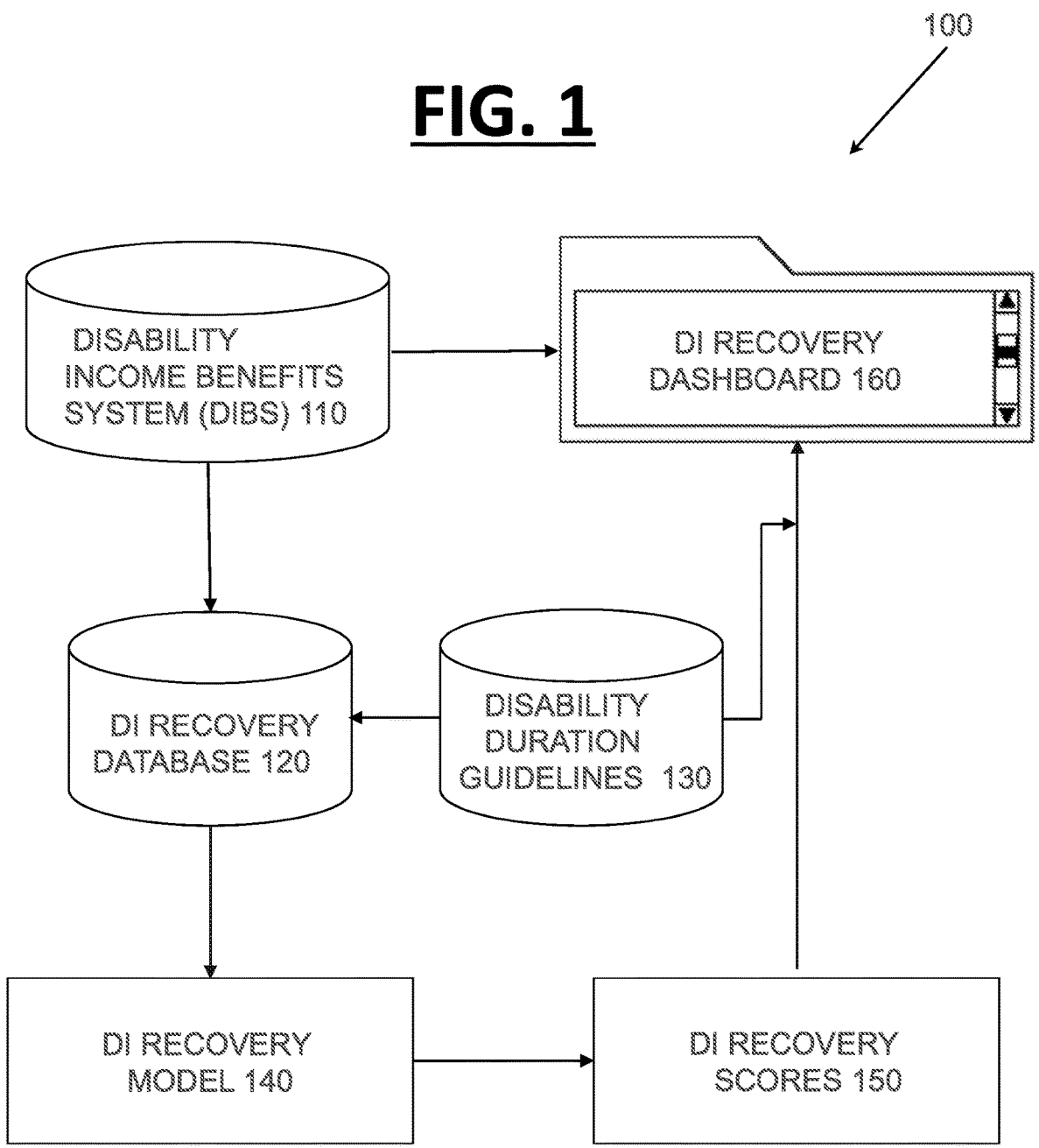
FIG. 1 is a system architecture of a system for managing DI recovery, according to an embodiment.

The present disclosure is herein described in details with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Described herein are computer-based systems and method embodiments that forecast likelihood of termination of a disability income claim, also referred to herein as a DI claim or DI insurance claim. The systems and methods analyze disability claimants that are most likely to reach full, return-to-work capacity using a predictive machine learning model, and display a specialized graphical user interface configured to present the claim recovery data. As used herein, the phrase "predictive model" might refer to any class of algorithms that are used to understand relative factors contributing to an outcome, estimate unknown outcomes, discover trends, and/or make other estimations based on a data set of factors collected across prior trials. In an embodiment, the predictive model may refer to methods such as logistic regression, decision trees, neural networks, linear models, and/or Bayesian models.

In general, for an employee who is disabled, which is typically an inability of the employee to perform all the functions of his or her position, the employee is paid a periodic amount (e.g., on a monthly basis, which may be a percentage of the employee's salary). The payments thus provide income for the employee while the employee is disabled and not receiving periodic paychecks. The payments are generally conditioned on expiration of an elimination period, and continuation of the disability.

Disability insurance may fall into a range of benefits periods. For example, benefits may be paid during a benefits period as short as several months, or as long as coverage through retirement age (e.g., age 65). In common practice, disability insurance falls into short term disability and long term disability categories. Short term disability coverage is for a disability that continues after an elimination period that is relatively brief, such as 15 or 30 days, and provides coverage for a period, such as 90 or 120 days. If the employee remains disabled at the end of the period for short term disability, long term disability coverage is available. Long term disability coverage requires an elimination period, generally equal to the maximum period of short term disability coverage, such as 90 to 120 days, and continues for a longer period of time, such as one or two years from the date of disability. The continuation of long term coverage is contingent on continuation of the disability.

In some cases, employers obtain insurance policies, which are issued to the employer to provide both long term and short term disability coverage. Premiums charged for short long term disability coverage may differ for the same employer. Premiums may be calculated based on employee compensation, and on the risk of disability associate with a particular job. For example, the premium charged for a given amount of compensation (e.g., $1000), will typically be higher for a factory worker than for an office worker. Premiums may also be calculated based on claim experience for the industry and/or the particular employer, among other factors.

The definition of disability is dependent on the particular requirements of an employee's job. For example, a factory worker may be deemed disabled under a policy if an injury prevents the factory worker from performing physical activities on a daily basis. In contrast, the same injury suffered by an office worker may not meet the applicable definition of disability.

When an injury occurs, the insured (either employer or employee) submits a claim to the insurance company under the DI policy. The claim must be accompanied by appropriate documentation, such as statements by the employee and reports of treating physicians. The insurance company may collect additional information when evaluating a claim, such as by reviewing additional records, arranging for further medical examinations, and the like. Upon approval by the insurance company of a claim under such a policy, the insurance company makes payments to the employee for the appropriate short or long term coverage. The insurance company also typically reevaluates the disability, and may take steps to promote returning to work, such as arranging for rehabilitation services to treat the cause of the disability. In some instances, the employer may remain responsible for payments, such as for short term disability coverage, but engage an insurance company to perform administrative services, such as evaluation of claims, review of approved claims, and related services.

In an embodiment shown in FIG. 1, a system 100 for managing DI recovery models the likelihood that DI claimants will achieve return-to-work capacity, or DI recovery. In an embodiment, system 100 models DI recovery for a modeling population including all DI claimant data (i.e., all persons that have filed a claim tracked in the 110). In an embodiment, database 110 is called the Disability Income Benefits System database, or "DIBS." In an embodiment, DIBS database 110 is maintained by an enterprise that managements DI claims, including monitoring ID claims in the DIBS database, administering DI benefits, and monitoring DI claim status including claimants who achieve return-to-work capacity resulting in DI claim termination. In an embodiment, Disability Income Benefits System (DIBS) database 110 is used by DI claims examiners and administrators to record all disability related claims data.

In various embodiments, the enterprise that manages DI claims is an insurance company or other financial services company, and the agents may include insurance agents. In some cases, the enterprise may be associated with only a single insurance provider. In other cases, an "independent" enterprise may be associated with several different insurance providers. In some cases, an insurance company handles payment of DI benefits, while in other cases DI benefits are paid by an employer that engages the insurance company to perform administrative services, such as evaluation of claims, review of approved claims, and related services.

Figure 2:
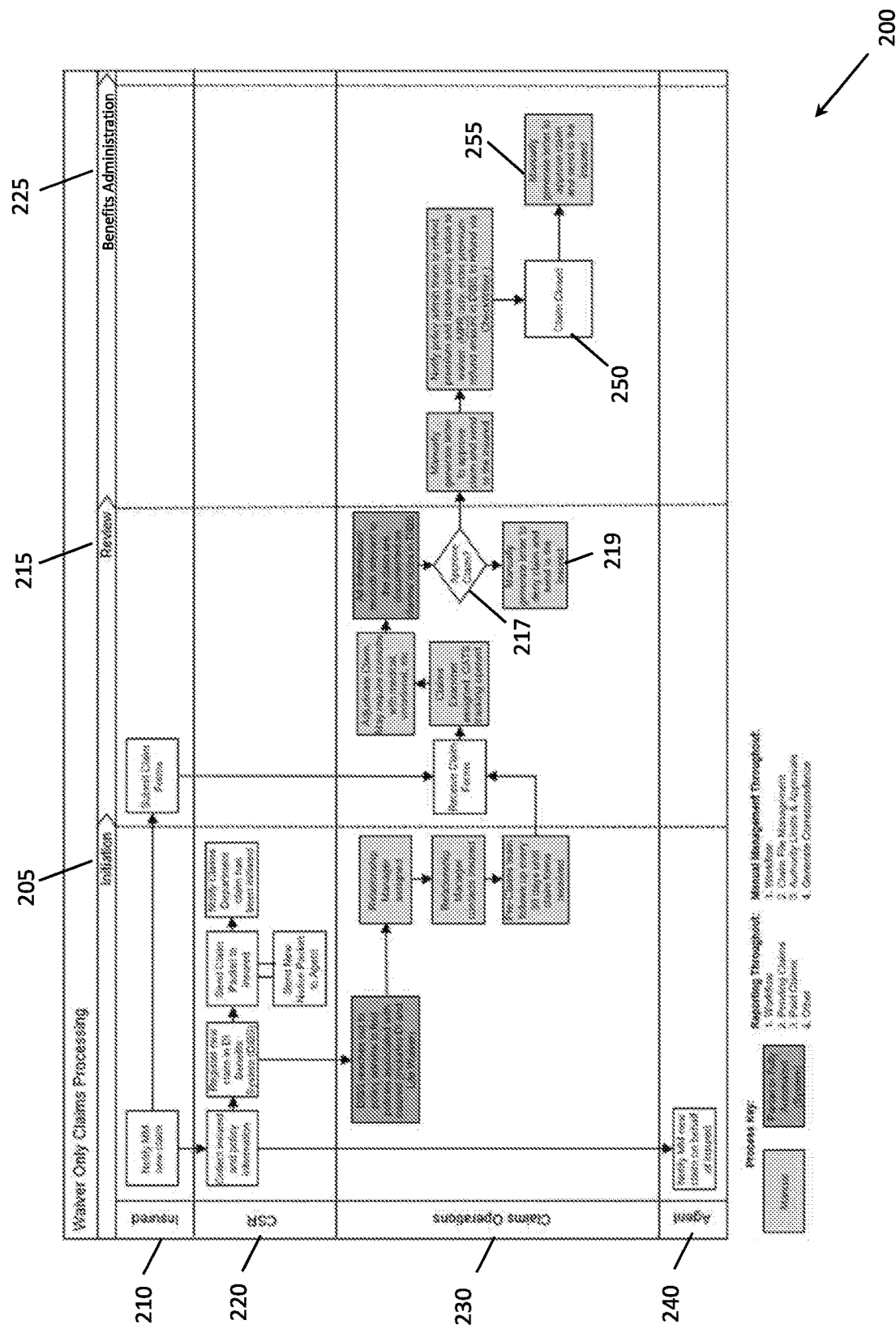
FIG. 2 is a flowchart of a procedure for processing disability income insurance claims, according to an embodiment.

FIG. 2 is a flow chart schematic of DI claims processing processes 200. At the claim initiation stage 205, when an DI claimant (insured) 210 or the insured's agent 240 notifies the enterprise of a new claim, a customer service representative (CSR 120) collects insured and policy information and opens a new the claim in the DIBS system. The claim is administered by claims operations 230. At claims initiation, the new claim is assigned to a relationship manager, who gathers claim information requests from the insured such as by requesting claims forms, used in the second, review stage 215 of claim processing. At the review stage 215, the insured submits claim forms, such as by completing electronic forms that are imported into DIBS and/or by submitting hard copy data that are scanned or transcribed into DIBS. Once the claims data is complete, the claim is assigned to a claims examiner who adjudicates the claim. The claims examiner may require additional information from other sources, and all supplemental data are imported into DIBS. If the claims examiner approves the claim at 217, the approved claim then advances to payment administration, stage 225. If the claims examiner denies the claim at 217, the enterprise communicates the claim denial to the insured at 219. The DI benefits administration stage 225 continues until termination 250 of the claim due to lump sum settlement, or other reason for closing of the claim. The process concludes with a communication 255 to the insured of closing of the DI claim.

Figure 3:
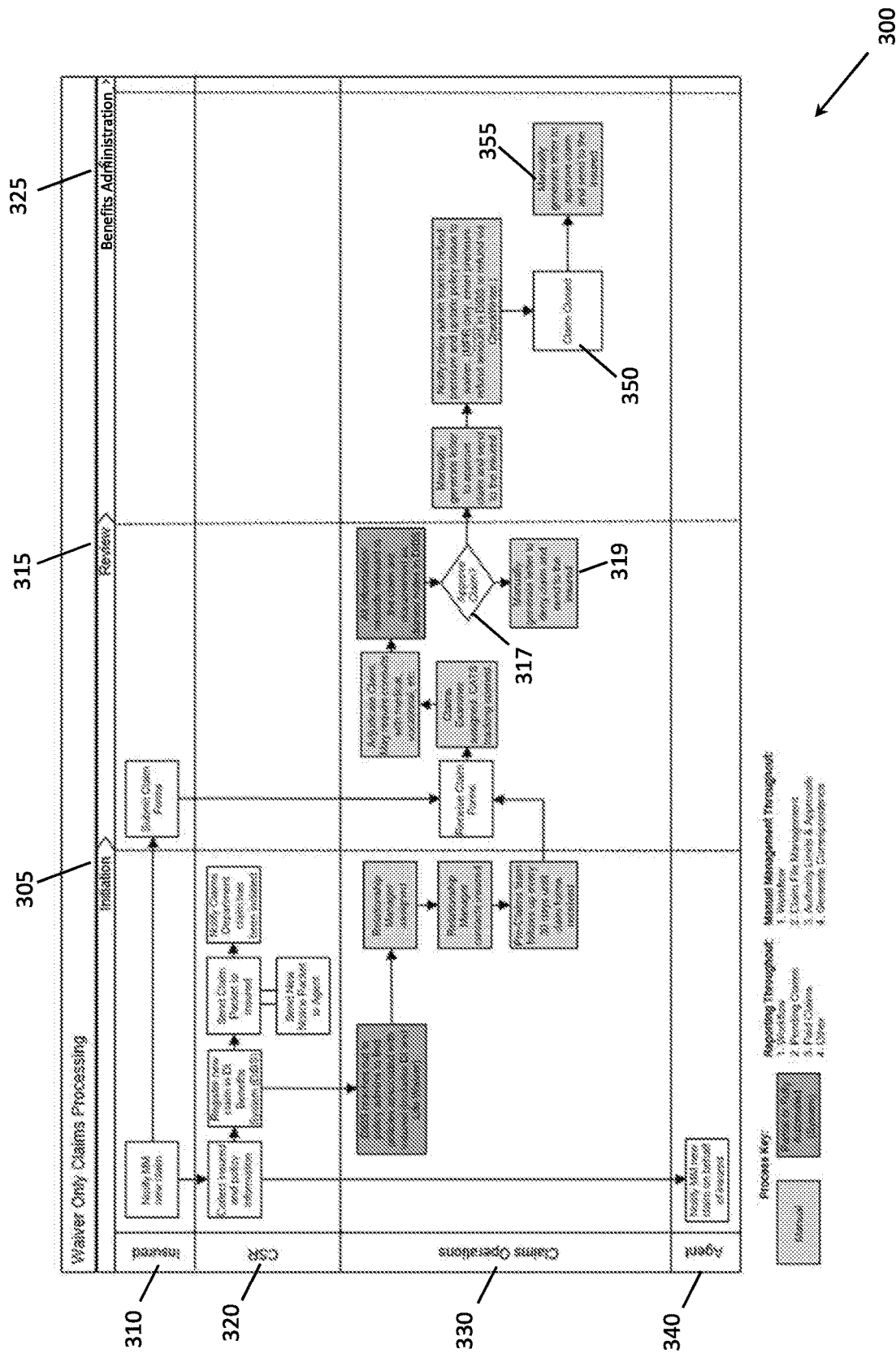
FIG. 3 is a flowchart of a procedure for processing waiver-only DI claims, according to an embodiment, according to an embodiment.

FIG. 3 is a flow chart schematic of waiver only claims processing procedures 300, which apply to DI policies that include a waiver of premium for disability (i.e., a provision that states the insurance company will not require the insured to pay the premium if the they are seriously injured, also herein called life waiver claims). The roles Insured 310, CSR 320, Claims Operations 330, and Agent 340 in waiver only claims processing are the same as roles 210, 220, 230, and 240 of the DI claims processing flowchart 200. Claims initiation 305 and claim review 315 follow the same procedures as stages 205 and 215 in DI claims processing 200. If the claims examiner approves 327 the claim, benefits administration 325 applies waiver only claim procedures defined by the DI policy that includes a waiver of premium for disability. Some insureds choose to have a waiver of premium rider attached to their policy because in the event of a disability, it allows the policy to continue functioning normally, including the death benefit, dividends, and cash values. Policies can vary on when and for how long the policy will waive a premium in the event of a disability. In an embodiment, this waiver applies retroactively to the beginning of the disability, and if the insured 310 made premium payments while the waiver was in effect, those premiums are refunded. At 350, the waiver only claim is closed (e.g., via payment) of premium refund. The procedure concludes with a communication 355 to the insured of closing of the waiver only DI claim.

Referring again to FIG. 1, data is exported from DIBS system 110 in building the modeling population in the DI Recovery Database 120, herein also called the DI Recovery Modeling Database. In an embodiment, data from DIBS 110 is uploaded continually (e.g., daily) to update DI Recovery Database 120. In an embodiment, the DI Recovery Database 120 uses DIBS schema in data warehouse software. In an embodiment, data fields of the DI Recovery Database 120 support the administration of both DI Claims (FIG. 2) and life waiver claims (FIG. 3) to model whether and when DI claimants are likely to achieve DI recovery. Example fields based on data exported from DIBS include case management, notes, diaries, templates, form management, calculations, and workflow.

The tables in the dibs schema can be joined with either claim number or claimant number (also called claimant ID in the present disclosure). In various embodiments, a given claimant is assigned one claimant ID, and a single claimant ID can have multiple associated claim numbers. In various embodiments, DI data in the DI recovery database 120 is constructed via data pre-processing methods that place the claim records into longitudinal format, including one-hot encoding diagnosis, and occupational features. In an embodiment, in DIBS 110 each claimant ID has related diagnosis description and occupation description fields entered as text strings. In an embodiment, in order to make use of these descriptions as features in the model, keywords from each field were extracted and one hot encoded into a set of binary variables with a value of 1 if the variable name appeared in the description field and a 0 otherwise. In an embodiment, these descriptions were extracted and one hot encoded into on the order of 300 binary variables.

In an embodiment, the system 100 for managing DI recovery incorporates disability duration guidelines obtained from a disability duration guidelines system 130. The disability duration guidelines indicate average time of recovery for given diagnoses. In an embodiment, medical disability guidelines system 130 is supplied by a third-party data provider. In an embodiment, the disability duration guidelines are medical disability guidelines. The workplace disability duration guidelines contain ICD codes information based on the International Statistical Classification of Diseases and Related Health Problems (ICD), a medical classification list of the World Health Organization (WHO). ICD codes include codes for diseases, signs and symptoms, abnormal findings, complaints, social circumstances, and external causes of injury or diseases. In an embodiment, the disability duration guidelines include the average length of a disability claim for each ICD diagnosis code.

In an embodiment, DI recovery modeling database 120 integrates the guidelines in the disability duration data in the DI recovery data. ICD codes for each claimant's diagnosis are matched to the row in the data corresponding to the specific ICD code. Based on this correlation, the DI recovery modeling database 120 integrates the average duration of a disability claim as determined by the disability duration guidelines. In an embodiment, the ICD codes are based on one or both of ICD-9 codes of WHO, and the newer ICD-10 dataset (tenth revision) that is replacing ICD-9 over time. In an embodiment, the DI recovery modeling database 120 is continually updated so that data exported from the DIBS system 110 matching to ICD-9 codes is replaced with data matching to ICD-10 codes, when the matching ICD-10 data becomes available at the disability duration guidelines 130.

Databases 110 and 120 are organized collections of data, stored in non-transitory, machine-readable storage. In an embodiment, the databases may execute or be managed by database management systems (DBMS), which may be computer software applications that interact with users, other applications, and the database itself, to capture (e.g., store and update data) and analyze data (e.g., query data, execute data analysis algorithms). In some cases, the DBMS may execute or facilitate the definition, creation, querying, updating, and/or administration of databases. The databases may conform to a well-known structural representational model, such as relational databases, object-oriented databases, and network databases. Example database management systems include MySQL, PostgreSQL, SQLite, Microsoft SQL Server, Microsoft Access, Oracle, SAP, dBASE, FoxPro, IBM DB2, LibreOffice Base, and FileMaker Pro.

DI recovery management system 100 can be executed by a server, one or more server computers, authorized client computing devices, smartphones, desktop computers, laptop computers, tablet computers, PDAs, and other types of processor-controlled devices that receive, process, and/or transmit digital data. System 100 can be implemented using a single-processor system including one processor, or a multi-processor system including any number of suitable processors that may be employed to provide for parallel, and/or sequential execution of one or more portions of the techniques described herein. System 100 performs these operations as a result of the central processing unit executing software instructions contained within a computer-readable medium, such as within memory. In one embodiment, the software instructions of the system are read into memory associated with the system 100 from another memory location, such as from storage device, or from another computing device via communication interface. In this embodiment, the software instructions contained within memory instruct the system 100 to perform processes described below. Alternatively, hardwired circuitry may be used in place of or in combination with software instructions to implement the processes described herein. Thus, implementations described herein are not limited to any specific combinations of hardware circuitry and software.

Of the total DI claims in the DI recovery modeling database 120, a portion of the claims have an active status, signifying that the claimants are receiving periodic (e.g., monthly) benefits. In an embodiment, in modeling return-to-work capacity, a claimant can reach full return-to-work capacity via any of the following claim termination events, also herein called recovery events. In an embodiment, DI modeling incorporates six types of claim termination event, as shown in Table 1. DI recovery model 140 uses these claim termination events as the positive class in the target variable. The DI claim management system 100 can inform claims examiners adjudicating a claim as to reasonable expectation of when individual claimants are likely to terminate a claim based on any of these preselected claim termination events. In an embodiment, the DI recovery model 140 indicates whether or not a claimant reaches full return-to-work capacity in a given time period (e.g., year) based on these claim termination events.

TABLE 1

| DI Claim Termination Events (Recovery Events) | |
|---|---|
| Event 1 | Return to work |
| Event 2 | Recovered |
| Event 3 | No medical certification of disability |
| Event 4 | Settlement (Claim) |
| Event 5 | Waiting period not satisfied |
| Event 6 | Failure to furnish proof of loss if previously in an approved status |

When claim examiners review DI claims, a principal consideration is the possibility of the claimant returning to work. A claims examiner investigates whether or not the claimant has recovered to a capacity that would allow the claimant to continue working. In an embodiment, the six types of claim terminations event shown in Table 1 were chosen as useful scenarios for claim examiners adjudicating DI claims in determining a reasonable expectation for closing out the claim (i.e., expectation for individuals achieving return-to-work capacity). In an embodiment, the claim terminations events included in the DI recovery model do not include claimants who reach their maximum benefit period, and do not include claimants who die, since these reasons for claim termination are not useful in adjudicating DI claims in planning interactions with claimants. In the present disclosure, claim termination events in the DI recovery model are also sometimes called recovery events.

In exploratory data modeling, the highest numbers of claim terminations have been found to occur when DI claimants return to work, Event 1. Other events indicating that a claimant has reached full return-to-work capacity include recovery from the disability, Event 2; no medical certification of the disability, Event 3; reaching a claim settlement, Event 4; waiting period not satisfied, Event 5; and failure to furnish proof of loss if previously in an approved status, Event 6.

In Event 2, DI claim termination on the basis that a claimant has "recovered" refers to claimants that have reached a level of health that permits them to continue working.

In Event 3, failure to provide medical certification of disability is considered a recovery event since a claimant who cannot or does not provide medical certification of his disability is presumed to have the capacity to work. Whereas most events are realized during the benefits administration phase (225 and 325), in some embodiments failure to provide medical certification of disability may occur during the review phase (215 and 315). In contrast, Event 6, failure to furnish proof of loss if previously in an approved status— generally occurs during the benefits administration phase for a previously approved claims 225 and 325).

In Event 4, reaching a claim "settlement" refers to closing a claim via a lump sum payment to the insured, for those claimants whose policy makes them eligible for this type of payment.

In Event 5, waiting period not satisfied pertains to a claim under a DI policy that includes a waiver of premium rider. Typically, such policies require a waiting period (e.g., 6 months) after the claimant becomes disabled in order for benefits to commence. This event indicates that the waiting period requirement was not satisfied.

Figure 4A:
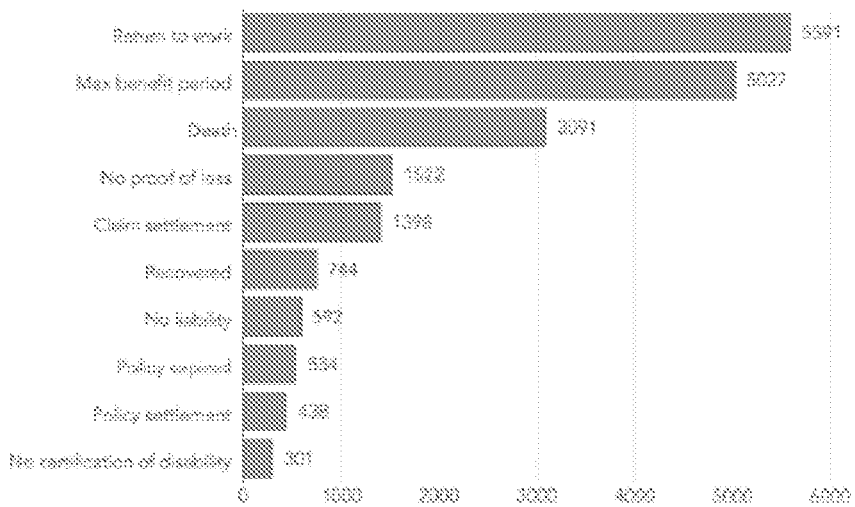
FIG. 4A displays top reasons for disability claim termination, according to an embodiment.
Figure 4B:
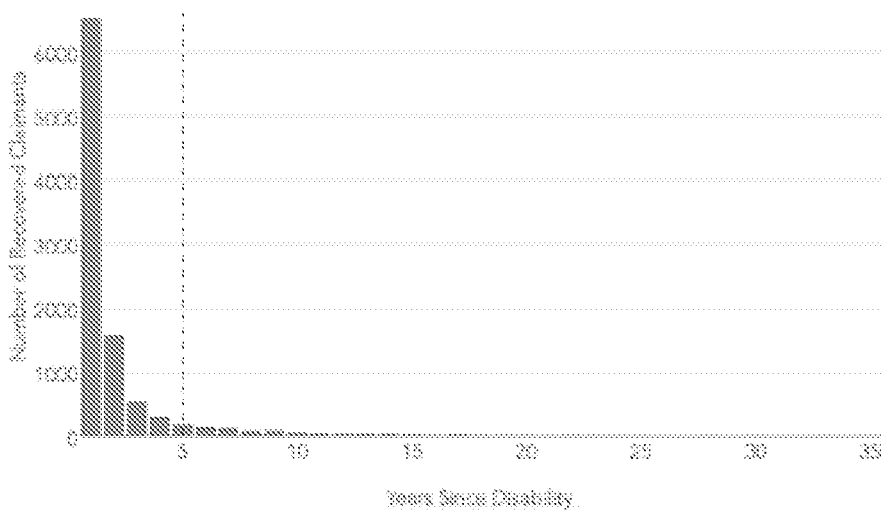
FIG. 4B displays age and gender distribution of time until recovery for DI claimants, according to an embodiment.

In an embodiment, in the development of DI recovery model 140, data exploration techniques were applied to the population of DI claimants who have reached full return-to-work capacity. Data analysis examined the distribution of this group over different variables from DIBS database 110. The graph of FIG. 4A shows the top reasons for termination of disability claims. The graph of FIG. 4B shows the distribution of recovery time for DI claimants. Data exploration has shown that for the DI recovery model to rank those claimants who are most likely to recover, the model also needs to also identify when these claimants are expected to reach full return-to-work capacity. The plot of FIG. 4B shows that the vast majority of claimants reach full return-to-work capacity within five years of their disability date.

The graph of FIG. 5 shows the distribution of age at the time of recovery. FIG. 5 shows age and gender distribution of recovered claimants. In the graph of FIG. 5, the right skewed distribution of recovery ages is much more prominent for male claimants. Female claimants have a more even distribution of recovery ages.

DI recovery modeling module 140, also referred to herein as the DI recovery model, models DI recovery for the modeling population including all DI claimant data (i.e., all persons that have filed a claim tracked in the Disability Income Benefits System (DIBS) database 110). In an embodiment, the system 100 for managing DI recovery includes a DI Recovery Dashboard 160, which displays results of modeling DI claimants for DI recovery. In an embodiment, DI Recovery Dashboard 160 displays DI recovery scores for selected DI claimants generated by DI Recovery Scores module 150 as an output of DI Recovery model 140. In an embodiment, the DI Recovery Dashboard 160 also can display disability duration guidelines exported from the Disability Duration Guidelines system 130.

As used in the present disclosure, a DI recovery score can include various types of metrics used in ranking claimants on the likelihood of realizing a DI recovery event. In an embodiment, a DI recovery score may indicate a higher probability of realizing a DI recovery event. In various embodiments, a DI recovery score may indicate the probability of realizing a DI recovery event during the current discrete time period, or may be indicate the probability of realizing a DI recovery event during a given later time period (e.g., year 2, year 5). In another embodiment, a DI recovery rank incudes a tier corresponding to a given DI recover score, wherein the tier is selected from a plurality of tiers that are based upon a distribution of DI recovery scores for a population of claimants. For example, "low," "medium," and "high" tiers may represent different segments or tiers of claimants within the distribution of DI recovery scores.

Figure 9:
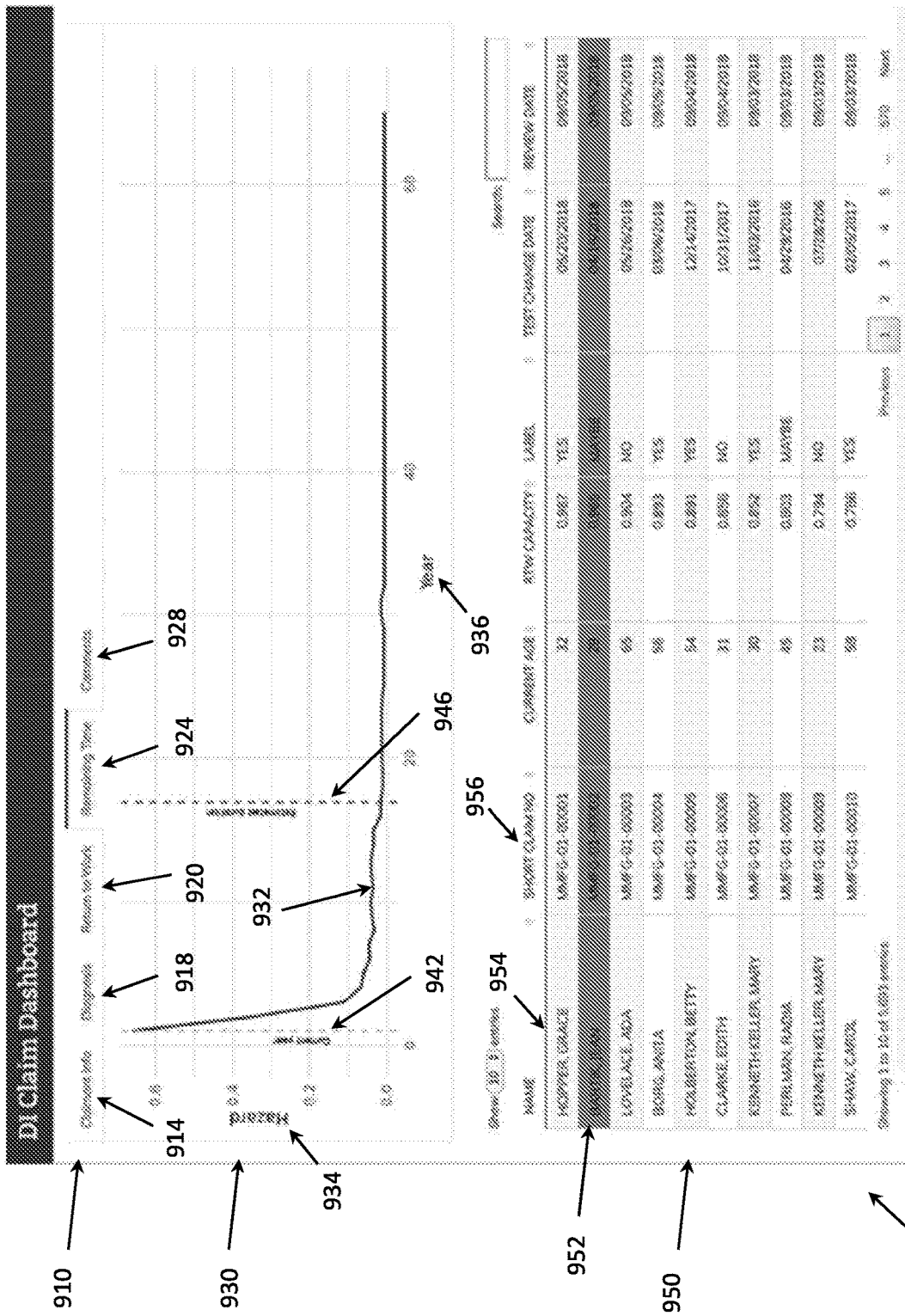
FIG. 9 is a representative view of a user interface, showing a dashboard displaying a report of DI claimant records and information representative of likelihood that respective claimants will realize a claim termination event, according to an embodiment.

In addition to DI recovery scores, claimants may be ranked for DI recovery based on estimated duration of claims, as shown for example at time indicator 946 of the dashboard of FIG. 9. For example, a claimant with an estimated duration of 3 years from current year would be higher ranked than a claimant with an estimated duration of 7 years from current year.

In various embodiments, in training the DI recovery model 140, records of disability claims are treated as standard event histories data. In event history analysis, the main outcome is measuring the likelihood of a specific event. Every case in the data set must be eligible for the event at the beginning of measurement. Time of occurrence must be well-measured and the beginning of time well-defined.

A specific type of event history analysis is survival analysis. A common problem in survival analysis is censoring, in which time to event is not observed for reasons such as termination of a study before all recruited subjects have shown the event of interest, or a subject leaving the study prior to experiencing an event. In modeling DI recovery, censoring can occur when a claim is terminated before the claimant reaches return-to-work capacity. Censoring also can occur when the claimant has not reached return-to-work capacity as of the current time.

Figure 6:
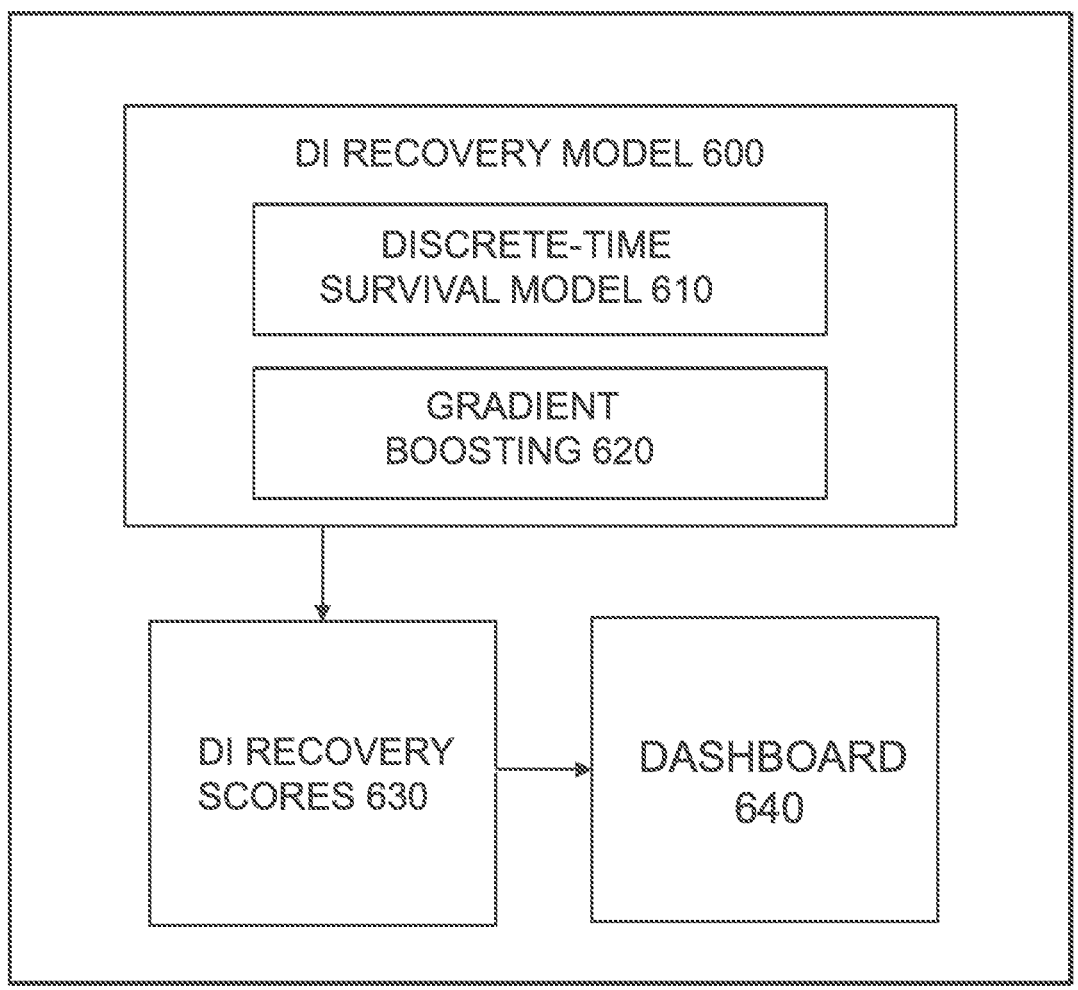
FIG. 6 is a block diagram of a portion of a DI recovery management system incorporating a gradient boosting model, according to an embodiment.

In an embodiment of DI recovery modeling module 140 shown in FIG. 6, DI recovery modeling module 600 incorporates a discrete-time survival model 610. Discrete-time survival analysis treats time not as a continuous variable, but as divided into discrete units. The discrete-time survival model has proven to be well suited for studying DI recovery event histories that might contain censored records and time-varying predictors. Censored observations still can be used in modeling, even though the outcome associated with the claim is not yet known. Another advantage is that the claimant's age, sub-status, and time since disability are all time-varying predictors that may create major difficulties in standard regression or classification models, but these time-varying predictors pose no problem when employing discrete-time survival modeling.

In an example claim data format, each person in the sample has one record (row) of data. In an embodiment, the discrete-time survival model 610 determines the hazard or conditional probability of an event (reaching full return-to-work capacity) in standard units of time (such as a one-year period), depending on several demographic and diagnosis features. In the following Formula A, the model defines discrete-time hazard, $h(t_i)$, as the conditional probability that an individual will realize the event at time $t_i$ given that he or she did not realize the event at time $t_{i-1}$, where $x2(t)$ is a time-varying predictor:

$$g(h(t_i))=\beta_0+\beta_1 x_1+\beta_2 x_2(t_2)+ \ldots +\beta_i x_i(t_i)$$

In an embodiment, to implement the discrete-time survival model, initial data transformation converts a person-organized data set into a data set organized by person-year. In the person-year data structure, each person has multiple records (rows of data), each record corresponding to one year of observation. Table 2 shows an embodiment of a person-year (longitudinal) data format for a discrete-time survival model.

TABLE 2

| | | | Person-year (longitudinal) data format for discrete-time survival model | | | | |
|---|---|---|---|---|---|---|---|
| ID | Start | End | Years since disability | Gender | Age | Death | Return to work |
| 01 | 2001 Apr. 1 | 2002 Mar. 31 | 1 | Female | 45 | 0 | 0 |
| 01 | 2002 Apr. 1 | 2003 Mar. 31 | 2 | Female | 46 | 0 | 0 |
| 01 | 2003 Apr. 1 | 2004 Mar. 31 | 3 | Female | 47 | 0 | 0 |
| 01 | 2004 Apr. 1 | 2005 Mar. 31 | 4 | Female | 48 | 0 | 0 |
| 01 | 2005 Apr. 1 | 2006 Mar. 31 | 5 | Female | 49 | 0 | 0 |
| 01 | 2006 Apr. 1 | 2007 Mar. 31 | 6 | Female | 50 | 0 | 1 |
| 02 | 2012 Aug. 20 | 2013 Aug. 19 | 1 | Male | 61 | 0 | 0 |
| 02 | 2013 Aug. 20 | 2014 Aug. 19 | 2 | Male | 62 | 0 | 0 |
| 02 | 2014 Aug. 20 | 2015 Aug. 19 | 3 | Male | 63 | 1 | 0 |

The predicted hazard from discrete-time survival modeling can be used to calculate survival probability and estimate claim duration in the future. In an embodiment, $t_1 < t_2 < t_3 < \ldots < t_n$ denote the ordered discrete survival time with probabilities $f(t_i) = P(T=t_i)$. The probability that an individual will survive past $t_i$ given current time $t_i$ is given by the following formulas:

$$P(T \geq t_i \mid T \geq t_j) = \frac{P(T \geq t_i)}{P(T \geq t_j)}, \text{ where}$$

$$P(T \geq t_i) = (1 - h(t_1))(1 - h(t_2)) \ldots (1 - h(t_{i-1}))$$

$$P(T = t_i \mid T \geq t_j) = \frac{P(T = t_i)}{P(T \geq t_j)}, \text{ where}$$

$$P(T = t_i) = P(T \geq t_i) - P(T \geq t_{i+1})$$

Following conversion of person-organized claim data into longitudinal person-year format, multiple observations may be derived from the same individual. All observations can be treated as independent observations in a standard logistic regression model. Therefore, in modeling DI recovery, a discrete-time survival model organized based on person-year acts as a classification model, which predicts hazard in each standard time period (e.g., year). No dependence correction is needed in the model fitting.

Figure 7:
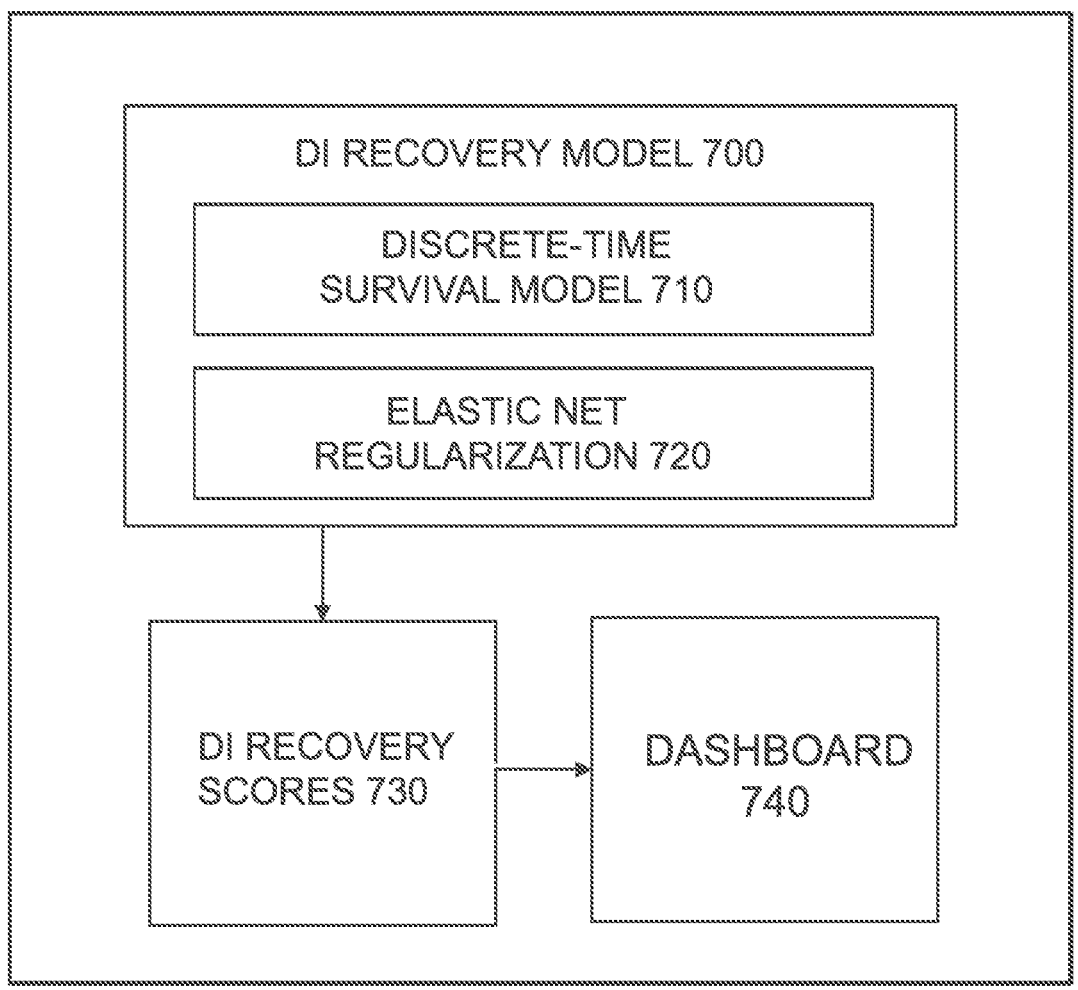
FIG. 7 is a block diagram of a portion of a DI recovery management system incorporating an elastic net regularization model, according to an embodiment.
Figure 8:
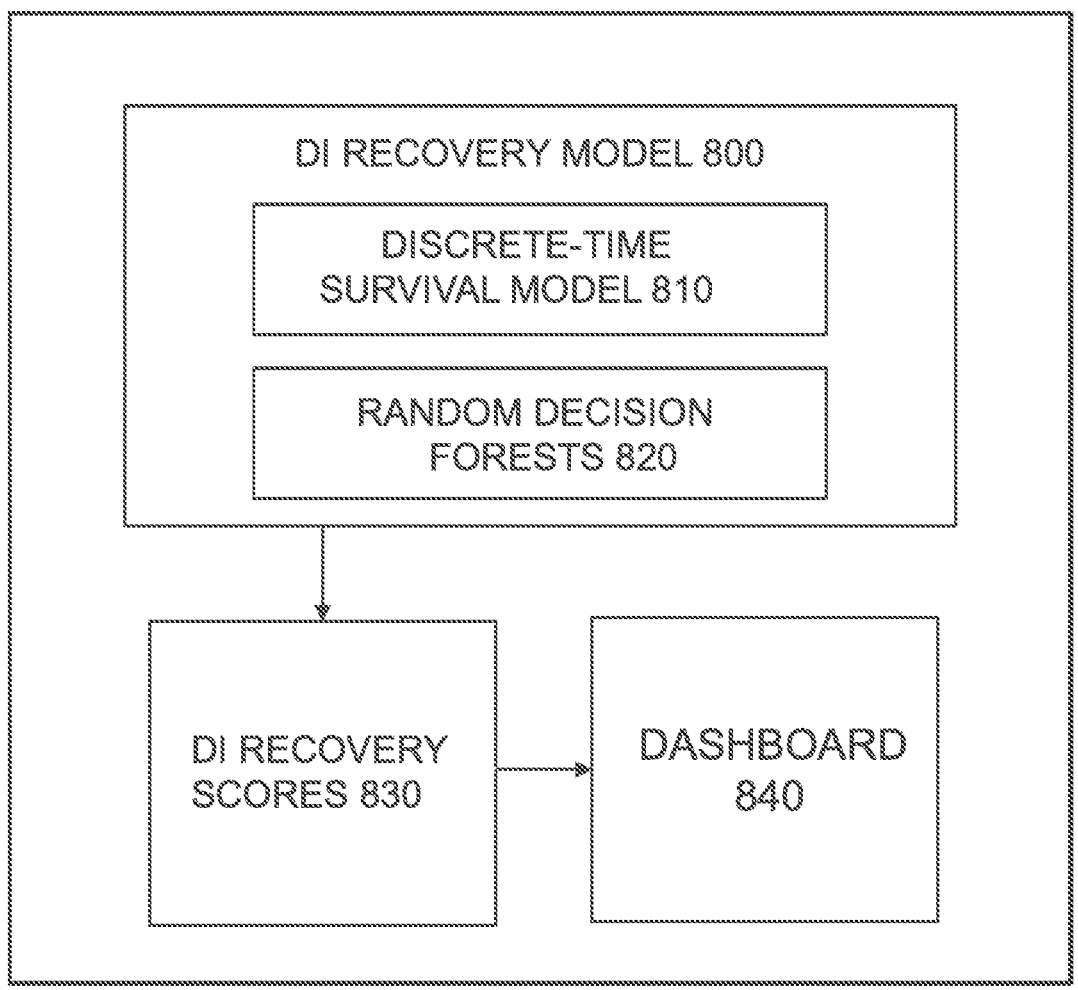
FIG. 8 is a block diagram of a portion of a DI recovery management system incorporating a random decision forests model, according to an embodiment.

In the embodiment of FIG. 6, the DI recovery model 600 incorporates gradient boosting 620 as a machine learning techniques for feature selection for analyzing model data and making hazard predictions, in conjunction with discrete-time survival model 610. As alternatives to gradient boosting, other machine learning techniques for feature selection tested in DI recovery models included a model 700 incorporating logistic regression with elastic net regularization 720 in conjunction with discrete-time survival (FIG. 7); and a model 800 incorporating random decision forest 820 in conjunction with discrete-time survival (FIG. 8). In various embodiments, each of these models generates DI recovery scores (e.g., DI recovery scores 630) that can be displayed by a DI recovery dashboard (e.g., dashboard 640).

Gradient boosting is a supervised machine learning technique for both regression and classification problems that produces a prediction model consisting of an ensemble of weak prediction models in the form of decision trees. Gradient boosting often serves as a high performance black box model, and lacks interpretability. In an embodiment of DI recovery model 600, the gradient boosting module 620 uses the XGBoost package in R. XGBoost is an acronym for eXtreme Gradient Boosting. XGBoost is an open-source software library that provides a gradient boosting framework, available at the repository github.com/dmlc/xgboost. XGBoost has been observed to provide computationally efficient gradient boosting with good prediction performance for a variety of machine learning problems. The package is designed to push the computational resource limits for boosted trees.

In an embodiment, the gradient boosting algorithm implemented in XGBoost builds the model in steps and generalizes them through loss function optimization. In the iterative building process, each successive tree uses the results of the trees before it to learn, typically outperforming random forest models. XGBoost also uses a regularized model formulation in its implementation, which helps to control over-fitting and improve test performance. Since XGBoost assumes that all the predictor columns are numeric, one-hot encoding was applied to the DI recovery model to include other columns as predictors, thereby transforming a value of each categorical column into a binary feature {0, 1}. The resulting dataset included numerous binary columns representing whether or not a claimant (row) has a given diagnosis or not (e.g., ICD-9 diagnosis). Before running the algorithm, the data was reformatted as required by the XGBoost package, and the hyperparameters were tuned to yield a final gradient boosting model 620.

In logistic regression with elastic net regularization, elastic net regression is a hybrid of ridge regression and lasso regularization. Like lasso, the elastic net can generate reduced models by generating zero-valued coefficients. When there are more predictions than observations, the lasso selects at most n variables before it saturates, because of the nature of the convex optimization problem, limiting its power as a variable selection method. Furthermore, lasso performance is observed to be reduced when there is a strong correlation between predictors. Elastic net at a=1 mimics the lasso when it performs best, and outperforms the lasso in scenarios as described above, where lasso does not perform well. As a shrinks toward 0, elastic net approaches ridge regression, while for other values of a, the penalty term $P\alpha(\beta)$ goes between the L1 norm of $\beta$ and the squared L2 norm of $\beta$.

Random forests, also known as random decision forests, are another supervised ensemble learning method for classification and regression. Random forests construct many decision trees at training time before outputting the class that is the mode of the classes (classification) or mean prediction (regression) of the individual trees. Random decision forests correct for the over-fitting on training data that often comes with decision trees. Random forest methods are often employed as a machine learning black box. In tests of model 800 including survival random forest 820 (FIG. 8), all available features were used due to the inherent lack of interpretability of the model.

In performance tests, logistic regression with elastic net regularization performed competitively with gradient boosting. This method offers advantage in interpretability in comparison to gradient boosting and random decision forests. Applicants have observed, however, that model interpretability is not important in modeling DI recovery and presenting modeling results. In designing the DI Recovery Dashboard 160, a DI Recovery Scores module 150 that scores candidates on their return-to-work capacity has been observed to provide a simple, effective way to prioritize DI claimants for follow-up action. These considerations can favor gradient boosting over the other models tested due to better performance as a classifier.

DI recovery models 140 effect a degree of feature selection. In various embodiments, DI recovery models 110 identify high importance features that have the most pronounced impact on likelihood that DI claimants will achieve return-to-work capacity. Different types of model may identify different features as most important. Table 3 shows an example of the top ten contributing factors for recovery indicated by the events of Table 1 as the positive class in the target variable. These features were selected from around 350 features including demographic, diagnosis, and occupation data of the DI Recovery Model 600 with Gradient Boosting 620.

TABLE 3

Most Important Features in DI Recovery Model with Gradient Boosting

| Variable | Description | Gain in xgboost |
| --- | --- | --- |
| year | Years since disability | 0.4959 |
| annual_premium | Yearly premium for disability insurance | 0.03671 |
| age_in_years | Claimant's age | 0.0302 |
| pregnancy | ICD10 diagnosis description contains the word "pregnancy" | 0.0292 |
| tot_monthly_income | Claimant's total monthly income before disability | 0.0234 |
| fracture | ICD10 diagnosis description contains the word "fracture" | 0.0204 |
| multiple_sclerosis | ICD10 diagnosis description contains the words "multiple sclerosis" | 0.0137 |
| foreman | Occupation description contains the word "foreman" | 0.0117 |
| radioculopathy | ICD10 diagnosis description contains the word "radioculopathy" | 0.0116 |
| chronic | ICD10 diagnosis description contains the word "chronic" | 0.0106 |

The system 100 for managing DI recovery includes a DI Recovery Dashboard 160 as a user interface for claims examiners and other system users. The user interface ranks active DI claimants by their DI recovery scores 150. In an embodiment, the DI recovery scores indicate probability of an individual's reaching full return-to-work capacity as determined by DI Recovery Model 140. In various embodiments, DI Recovery Dashboard 160 displays various types of information, including visual representations of DI recovery. DI Recovery Dashboard 160 is a living system, which continually updates displayed information based on information input by a claims examiner or other user. Additionally, DI Recovery Dashboard 160 updates the display information based on ongoing uploads from the DIBS system 110 to the DI Recovery Database 120, based on updates to the Disability Duration Guidelines 130, and updated outputs from the DI Recovery Modeling module 140 and the DI Recovery Scores module 150.

FIG. 9 shows a DI Recovery Dashboard 900 including a series of tabbed dashboards 910 that show reports of various types of information, a display section 930, and a dataframe 950. Tabbed dashboards include claimant information dashboard 914, diagnosis dashboard 918, return to work dashboard 920, remaining time dashboard 924, and comments dashboard 928. Each row in dataframe 950 corresponds to a particular claim number (shown in Short Claim No. column 956) with an associated claimant (claimant's name shown in column 954). Selecting a row in the dataframe 950 such as row 952 causes DI Recovery Dashboard 900 to display 930 information for the claim number identified in the selected row. The dashboard 900 can display claimant demographic information 914 and diagnosis information 918. In an embodiment, return to work dashboard 920 displays a bar chart showing the claimant's probability of reaching full return-to-work capacity for each year of her life, starting with the claimant's current age. In an embodiment, remaining time dashboard 924 displays a claimant's hazard plot, including the duration of the claim as estimated the model as well as the current year. At comments dashboard 928, users such as claims examiners can add and view comments about given claimants or given claims.

In FIG. 9, remaining time dashboard 924 is selected, displaying at 930 a curve 932 of hazard 934 on the vertical axis versus time 936 (in years) on the horizontal axis. Curve 932 is a hazard plot representing a conditional probability over time that the respective claimant will realize a preselected claim termination event such as one of the recovery events of Table 1. Time indicator 942 indicates the current year, while time indicator 946 indicates the estimated duration of the claim as predicted by the DI recovery model. In an embodiment, these visual elements 932, 942, and 946 can be updated in real time based on updated modeling data or user inputs to the system 100 for managing DI recovery.

Figure 10:
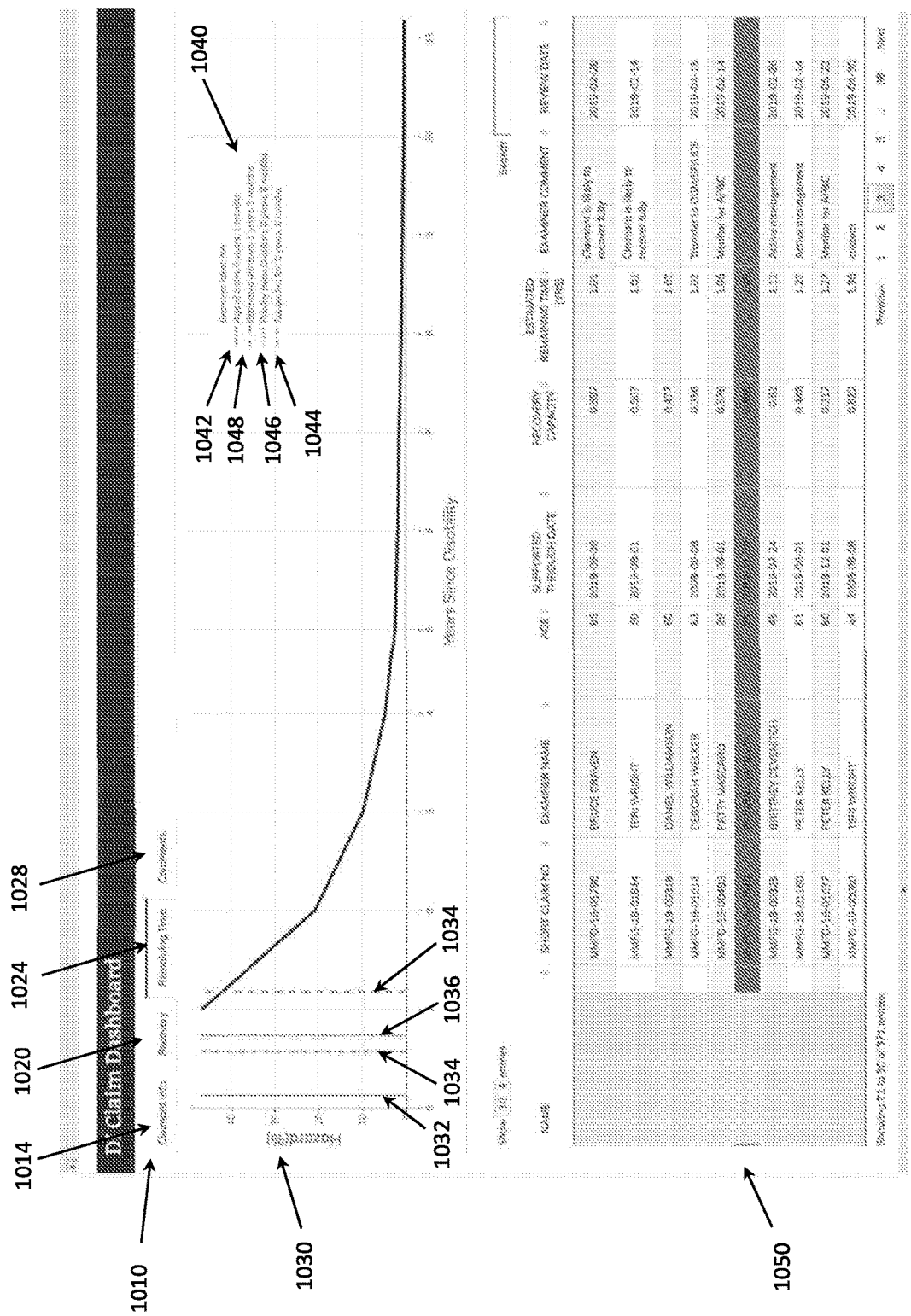
FIG. 10 is a representative view of a user interface, showing a dashboard displaying a report of DI claimant records and information representative of likelihood that respective claimants will realize a claim termination event, according to an embodiment.

In various embodiments, a DI claim dashboard may display other disability recovery time metrics besides recovery time predicted by the DI recovery model. FIG. 10 shows a DI Recovery Dashboard 1000 including a series of tabbed dashboards (or pages) 1010 that show reports of various types of information, a display section 1030, and a dataframe 1050. Tabbed dashboards 1010 include claimant information dashboard 1014, recovery dashboard 1020, remaining time dashboard 1024, and comments dashboard 928. In the illustrated embodiment, remaining time dashboard 1024 displays a claimant's hazard plot, including recovery time metrics represented by four time markers 1032, 1034, 1036, and 1038. A legend 1040 lists the visual formats and recovery time metrics of the respective time markers. For each time marker, legend 1040 displays the interval of time from disability in years and months. Other or additional visual formats, such as color coding, may be employed for the time markers. Having reference to legend 1040, solid-line time marker 1032 indicates the age of the claim (current time of the claim 1042, i.e., 0 years 1 month. Dotted-dash line time marker 1034 indicates disability recovery time predicted by medical literature 1044, i.e., 0 years six months. Dotted-line time marker 1036 indicates disability duration indicated by Presley Reed workplace disability guidelines 1046, i.e., 0 years 8 months. Dashed-line time marker 1038 indicates recovery time predicted by the DI recovery model of the present disclosure 1048, i.e., 1 years 2 months.

Figure 11:
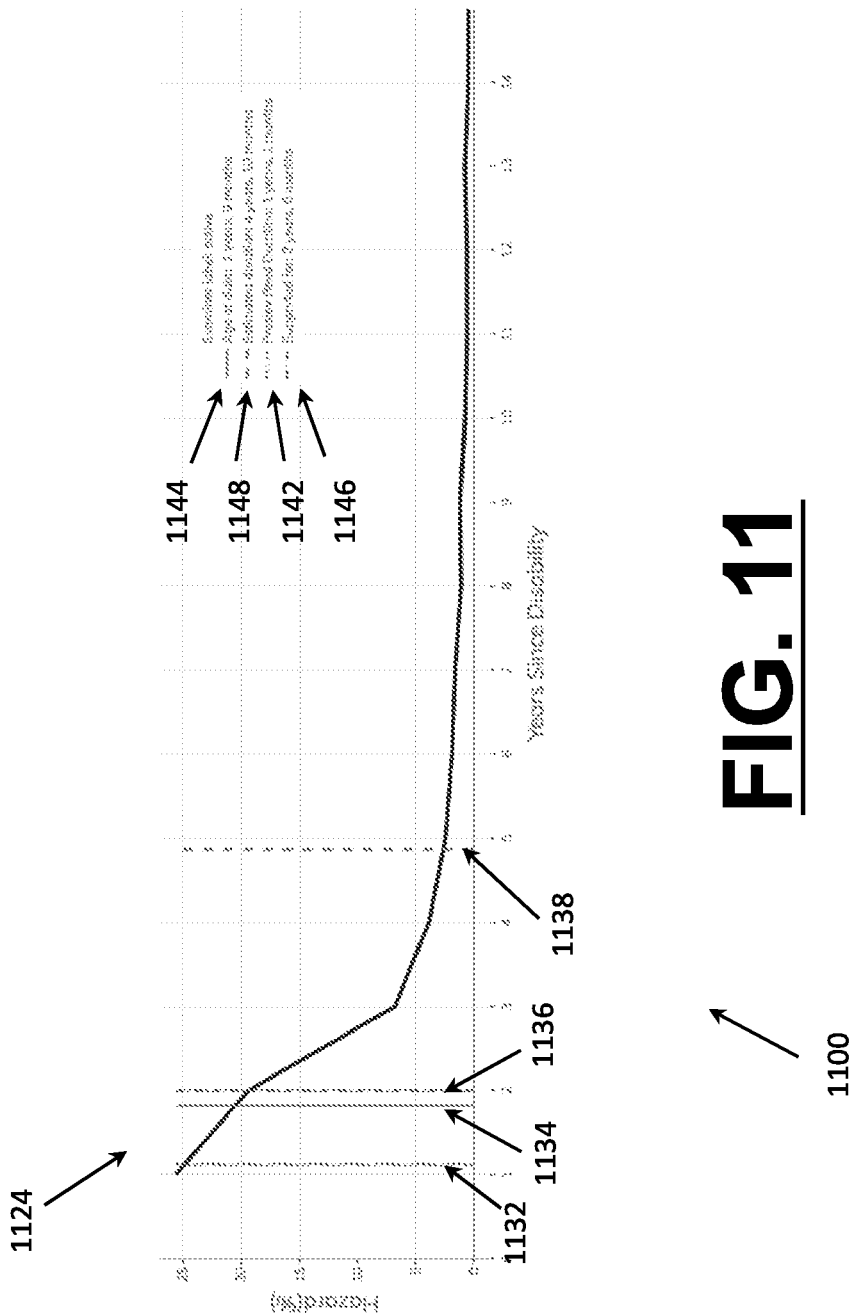
FIG. 11 is a representative view of a user interface, showing a claimant's hazard plot from a disability claim dashboard, according to an embodiment.

The user interface 1100 of FIG. 11 shows a remaining time dashboard 1124 that displays a claimant's hazard plot at a later time during a claim's active life. Recovery time metrics are represented by time markers 1132, 1134, 1136, and 1138. Dotted-line time marker 1132 indicates disability duration indicated by Presley Reed workplace disability guidelines 1142 (i.e., 1 year and 1 month). Solid-line time marker 1134 indicates the age of the claim 1144 (current time of the claim) (i.e., 1 year and 9 months). Dotted-dash time marker 1136 indicates disability recovery time predicted by medical literature 1146 (i.e., 2 years and 0 months). Dashed-line time marker 1138 indicates recovery time predicted by the DI recovery model of the present disclosure 1148 (i.e., 4 years and 10 months). As shown in FIGS. 10, 11, the system for managing DI recovery of the present disclosure tracks predicted claim recovery dynamically during the life of a claim, and can provide claim examiners and other users with additional disability recovery time metrics representing useful comparative data to supplement the predictions of the DI recovery model.

Example: In an embodiment of model training, a validation subset of the training data (consisting of 40% of the full dataset) was used for hyperparameter tuning. The DI recovery model was trained using these optimized hyperparameters on training data including 40% of the full dataset. Thereafter, the DI recovery model was tested on the held out test data including 20% of the full dataset to measure performance. The data was randomly divided at short claim number level (individual level) to create training data and test/validation data. The model training procedure included multiple samples per claimant, and ensured that the test and training/validation sets were mutually exclusive by short claim number and thus by individual.

In cross validation, parameters of gradient boosting were optimized on a subset of the training data (validation set) by testing different combination of parameters for the models to get the maximum validation accuracy (e.g., as measured by area under the curve, "AUC", of receiver operator curves). As an initial step of hyperparameter tuning, an xgboost model was trained with default parameters. To tune the hyperparameters, the training procedure used the higher default learning rate (eta) to support the computationally intensive process of a grid search. The number of rounds were also fixed for hyperparameter tuning, increasing the number of rounds to support lower learning rates. Using the best parameters from the grid search, the learning rate was then decreased and the number of rounds was increased to support the change.

Example: In order to analyze performance of DI recovery models incorporating various machine learning techniques for feature selection, receiver operator curves (ROC) and graphs of lift across deciles were generated for each of these models as shown in FIGS. 12-14. Receiver-operator curves (ROC) show sensitivity as a function of the false positive rate (100-Specificity) for different cut-off points. A key metric of model performance is area under the curve (AUC) of the receiver-operator curve (ROC). Lift provides a measure of the degree of improvement of a predictive model over analysis without a model.

In the model performance graphs of FIG. 12, features in the final model were selected based on feature importance determined via gradient boosting (xgboost). In tests of independent holdout sample data, the AUC of the gradient boosting model was 0.904. The gain curve from the recovery model indicated that the top 10% of positive predictions can cover 63% of true positive labels. The lift curve indicated that the model is 6.34 times more efficient than a random review of the claim cases.

In the model performance graphs of FIG. 13, features in the final model were selected based on feature importance determined via elastic net regression (logistic regression with elastic net regularization). In the model performance graphs of FIG. 14, features in the final model were selected based on feature importance determined via random decision forests.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM, or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A processor-based method comprising:
   executing, by a processor, an event history machine learning model utilizing a discrete-time interval analysis configured to predict recovery data for each claimant record of a plurality of claimant records stored in a database, by receiving disability income claim data representative of disability income insurance claims and claimants and outputting one or more claimant records including recovery data representative of a likelihood that respective claimant records will realize a claim termination event based at least on analyzing discrete-time intervals,
   wherein the claim termination event is one of a plurality of preselected recovery events representative of a claimant achieving return-to-work capacity,
   wherein the event history machine learning model is trained using updated disability income claim data representative of the disability income insurance claims and claimants; and
   running, by the processor, the event history machine learning model on demand to update and display, by a display device in operative communication with the processor, a graphical user interface showing the recovery data representative of the likelihood that the respective claimants will realize a claim termination event.

2. The method of claim 1, wherein the event history machine learning model utilizes discrete-time survival analysis for feature selection.

3. The method of claim 1, wherein the event history machine learning model utilizes survival analysis in conjunction with a machine learning model for feature selection.

4. The method of claim 3, wherein the machine learning model for feature selection is a gradient boosting machine learning model.

5. The method of claim 3, wherein the machine learning model for feature selection is a logistic regression model with elastic net regularization.

6. The method of claim 3, wherein the machine learning model for feature selection is a random decision forests model.

7. The method of claim 1, wherein the event history machine learning model is a predictive machine learning model that is continually trained by transforming the updated disability income claim data into a longitudinal format that includes multiple person-time period records corresponding to each claimant record, each person-time period records corresponding to a respective time period of observation for the respective claimant record.

8. The method of claim 1, wherein the updated disability income claim data includes diagnosis data representative of workplace disability duration guidelines.

9. The method of claim 8, wherein the diagnosis data include an ICD code for each claimant record, and the diagnosis data are representative of Presley Reed workplace disability duration guidelines corresponding to the ICD code.

10. The method of claim 1, wherein the event history machine learning model outputs a plurality of ranked claimant records ranked by likelihood that respective claimant records will realize a claim termination event, wherein the graphical user interface shows a report of the plurality of ranked claimant records.

11. The method of claim 1, wherein the recovery data comprises a recovery score representative of the likelihood that respective claimant records will realize a claim termination event.

12. The method of claim 1, wherein the recovery data comprises a conditional probability of each of the respective claimant records realizing the claim termination event, wherein the graphical user interface displays the conditional probability of each of the respective claimant records realizing the claim termination event.

13. The method of claim 1, wherein the recovery data comprises a probability of realizing the claim termination event during respective years of each respective claimant's life, wherein the graphical user displays a chart representing the probability of realizing the claim termination event during the respective years of each respective claimant's life.

14. The method of claim 1, wherein the processor is configured to update and display, for each of the plurality of claimant records, a hazard plot representative of a conditional probability over time that the respective claimant will realize the claim termination event.

15. A processor-based method comprising:
   executing, by a processor, an event history machine learning model utilizing a discrete-time interval analysis configured to predict recovery data for each claimant record of a plurality of claimant records stored in a database utilizing survival analysis, by receiving disability income claim data representative of disability income insurance claims and claimants and outputting one or more claimant records including recovery data representative of a likelihood that respective claimant records will realize a claim termination event based at least on analyzing discrete-time intervals, wherein the claim termination event is one of a plurality of preselected recovery events representative of a claimant achieving return-to-work capacity, wherein the event history machine learning model is trained using updated disability income claim data representative of the disability income insurance claims and claimants, wherein the event history machine learning model is trained by transforming the updated disability income claim data into a longitudinal format that includes multiple person-time period records corresponding to each claimant record; and running, by the processor, the event history machine learning model on demand to update and display, by a display device in operative communication with the processor, a graphical user interface showing the recovery data representative of the likelihood that the respective claimants will realize a claim termination event.

16. The method of claim 15, wherein the event history machine learning model utilizes discrete-time survival analysis in conjunction with a machine learning model for feature selection.

17. A system comprising:
non-transitory machine-readable memory that stores claimant records for a plurality of claimants for disability income insurance, and disability income claim data representative of disability income insurance claims and claimants;

an event history machine learning model utilizing a discrete-time interval analysis configured to predict recovery data for each claimant record of the plurality of claimant records and to output one or more claimant records including recovery data representative of a likelihood that respective claimant records will realize a claim termination event based at least on analyzing discrete-time intervals, wherein the claim termination event is one of a plurality of preselected recovery events representative of a claimant achieving return-to-work capacity, wherein the event history machine learning model is trained using updated disability income claim data; and a processor in operative communication with a display device, wherein the processor in communication with the non-transitory, machine-readable memory executes a set of instructions instructing the processor to:
receive the claimant records for the plurality of claimants and the disability income claim data representative of disability income insurance claims and claimants from the non-transitory machine-readable memory;

apply the event history machine learning model to the claimant records for the plurality of claimants and the disability income claim data representative of disability income insurance claims and claimants to predict the recovery data for each claimant record of the plurality of claimant records and output the one or more claimant records including the recovery data representative of a likelihood that respective claimant records will realize a claim termination event; and run the event history machine learning model on demand to update and display, by the display device in operative communication with the processor, a graphical user interface showing the recovery data representative of the likelihood that the respective claimants will realize a claim termination event.

18. The system of claim 17, wherein the event history machine learning model utilizes discrete-time survival analysis in conjunction with a machine learning model for feature selection.

19. The system of claim 17, wherein the non-transitory machine-readable memory further stores diagnosis data representative of workplace disability duration guidelines, wherein the updated disability income claim data includes the diagnosis data representative of the workplace disability duration guidelines.

20. The system of claim 17, wherein the recovery data comprises one or more of a plurality of ranked claimant records ranked by likelihood that respective claimant records will realize a claim termination event, a recovery score representative of the likelihood that respective claimant records will realize a claim termination event, a conditional probability of each of the respective claimant records realizing the claim termination event, and a probability of realizing the claim termination event during respective years of each respective claimant's life.

* * * * *